United States Patent
Ricci Moretti et al.

(10) Patent No.: US 11,554,860 B1
(45) Date of Patent: Jan. 17, 2023

(54) APPARATUS, SYSTEM AND METHOD FOR A CONVERTIBLE THRUSTER FOR A COMPOUND AIRCRAFT

(71) Applicant: Piasecki Aircraft Corporation, Essington, PA (US)

(72) Inventors: Luigi U Ricci Moretti, Swarthmore, PA (US); Frederick W. Piasecki, Haverford, PA (US); George L. Firpi, Glenolden, PA (US); Shane A. Lewis, West Chester, PA (US)

(73) Assignee: Piasecki Aircraft Corporation, Essington, PA (US)

(*) Notice: Subject to any disclaimer, the term of this patent is extended or adjusted under 35 U.S.C. 154(b) by 31 days.

(21) Appl. No.: 17/354,707

(22) Filed: Jun. 22, 2021

Related U.S. Application Data

(60) Provisional application No. 63/042,719, filed on Jun. 23, 2020.

(51) Int. Cl.
*B64C 27/82* (2006.01)
*B64C 13/12* (2006.01)
*B64C 27/22* (2006.01)

(52) U.S. Cl.
CPC ............. *B64C 27/22* (2013.01); *B64C 27/82* (2013.01); *B64C 13/12* (2013.01);
(Continued)

(58) Field of Classification Search
CPC . B64C 27/22; B64C 27/82; B64C 2027/8209; B64C 2027/8218; B64C 2027/8272; B64C 13/12
See application file for complete search history.

(56) References Cited

U.S. PATENT DOCUMENTS 3,155,341 A * 11/1964 Girard .................... B64C 27/26
244/17.19
3,404,737 A    10/1968 Keder
(Continued)

FOREIGN PATENT DOCUMENTS

CA         2580110        4/2006
DE    102012104783 B4    12/2019
(Continued)

OTHER PUBLICATIONS

Robert A. Ormiston, "Realizing the Potential of the Compound Helicopter," Vertiflite, vol. 62, No. 3, p. 50, May/Jun. 2016.
(Continued)

*Primary Examiner* — Brian M O'Hara
(74) *Attorney, Agent, or Firm* — Robert J. Yarbrough of Lipton, Weinberger & Husick

(57) ABSTRACT

A compound aircraft includes a convertible thruster that pivots between an anti-torque position, a forward thrust position, and intermediate positions. A pilot has two inceptors to control thruster rotor pitch in the anti-torque and forward thrust positions. A mixer mechanically blends the signals from the two inceptors during transition between the anti-torque and forward thrust positions. A transfer rod coaxial with the pivot axis of the convertible thruster conveys convertible thruster pitch commands from the pilot to a pitch control actuator. The pitch control actuator may be located partially within the rotor of an electric motor that rotates the convertible thruster rotor. The electric motor and pitch control actuator are unitary. Both the electric motor and pitch control actuator pivot with the convertible thruster. The pitch actuator output shaft is coaxial to and disposed within a hollow electric motor output shaft.

21 Claims, 27 Drawing Sheets

(52) U.S. Cl.
CPC ............... *B64C 2027/8209* (2013.01); *B64C 2027/8218* (2013.01); *B64C 2027/8272* (2013.01)

(56) References Cited

U.S. PATENT DOCUMENTS

| | | | |
|---|---|---|---|
| 4,928,907 A * | 5/1990 | Zuck | B64C 27/26 244/6 |
| 7,188,802 B2 | 3/2007 | Magre | |
| 7,438,259 B1 * | 10/2008 | Piasecki | B64C 27/26 244/175 |
| 8,240,617 B2 * | 8/2012 | Biest | B64C 27/26 701/4 |
| 8,763,949 B2 * | 7/2014 | Thomassey | B64C 27/82 244/17.19 |
| 8,777,152 B2 * | 7/2014 | Thomassey | B64C 27/82 244/17.19 |
| 8,979,015 B2 | 3/2015 | Gaillard | |
| 9,174,730 B2 | 11/2015 | Litwinowicz | |
| 9,365,289 B2 * | 6/2016 | Prud'Homme-Lacroix | B64C 27/56 |
| 10,112,697 B2 | 10/2018 | Waltner | |
| 10,124,888 B2 | 11/2018 | Pounds | |
| 10,167,078 B2 * | 1/2019 | Waltner | B64C 5/02 |
| 10,293,932 B2 | 5/2019 | Alzahrani | |
| 10,642,283 B2 * | 5/2020 | Greenfield | G05D 1/0858 |
| 10,787,253 B2 | 9/2020 | Parsons | |
| 11,148,785 B2 * | 10/2021 | Ahmad | B64C 13/28 |
| 11,203,424 B2 * | 12/2021 | Darmstadt | B64C 27/16 |
| 2010/0230547 A1 | 9/2010 | Tayman | |

FOREIGN PATENT DOCUMENTS

| | | |
|---|---|---|
| EP | 2619089 | 7/2013 |
| EP | 2619087 | 5/2014 |
| RU | 2601470 | 10/2016 |

OTHER PUBLICATIONS

Carl Russell and Wayne Johnson (NASA Ames Research Center, Moffett Field, California), "Exploration of Configuration Options for a Large Civil Compound Helicopter," American Helicopter Society 69th Annual Forum, May 21, 2013.

Ananth Sridharan, "Towards Coupling of Comprehensive Analysis into Design Sizing of a High-Speed Asymmetric Compound Helicopter," Alfred Gessow Rotorcraft Center, Department of Aerospace Engineering, University of Maryland, College Park, MD, 42nd European Rotorcraft Forum, Lille France, Sep. 5, 2017.

* cited by examiner

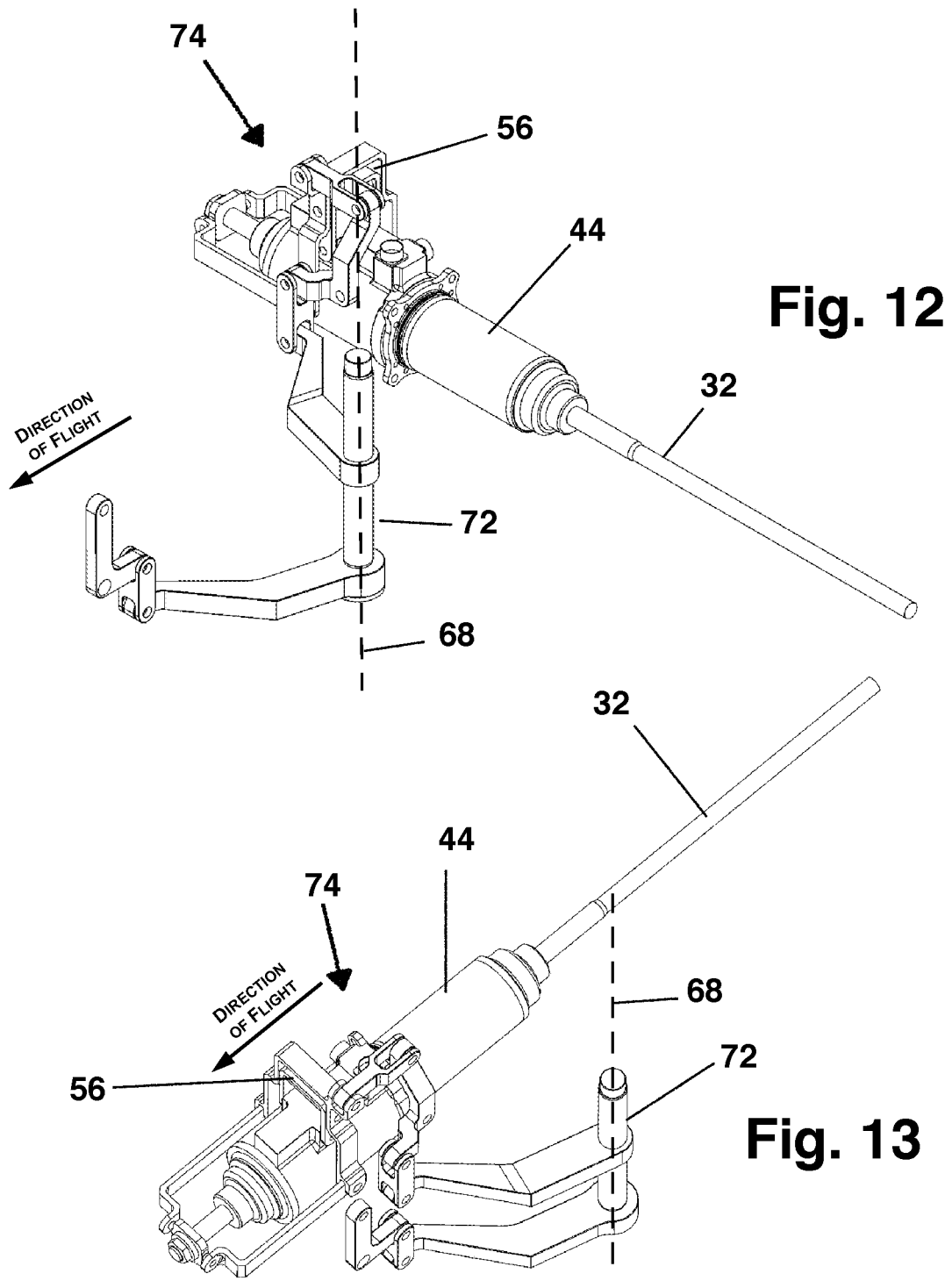

APPARATUS, SYSTEM AND METHOD FOR A CONVERTIBLE THRUSTER FOR A COMPOUND AIRCRAFT

I. BACKGROUND OF THE INVENTION

A. Field of the Invention The Invention relates to a compound aircraft having a convertible thruster that pivots between a forward thrust position, an anti-torque position, and positions intermediate to the forward thrust and anti-torque positions. In the forward thrust position, the convertible thruster provides forward thrust to the compound aircraft. In the anti-torque position and intermediate positions, the convertible thruster provides thrust to balance the torque of the main rotor and to provide control authority in yaw and trim.

The convertible thruster includes a unitary electric motor and pitch control actuator. The electric motor turns a thruster rotor. The pitch control actuator controls the pitch of the thruster rotor. The Invention relates to the control of the unitized convertible thruster for all positions, to the powering of the unitized convertible thruster, to the pivoting of the unitized convertible thruster between positions, and to the cooling of the unitized convertible thruster.

B. Statement of the Related Art

A single rotor conventional helicopter depends upon a main rotor to provide all lift and thrust in all directions and to trim pitch and roll moments. The single rotor conventional helicopter traditionally uses a tail rotor to balance the torque of the main rotor and hence control yaw. A pilot of the conventional helicopter controls the yaw of the helicopter by deflecting rudder pedals. The rudder pedals change the pitch of the blades of the tail rotor, increasing or decreasing the thrust applied by the tail rotor to the airframe. The speed of rotation of the tail rotor of the conventional helicopter is mechanically geared to the speed of rotation of the main rotor and the pilot generally does not have the option of changing the speed of rotation of the tail rotor.

A compound aircraft includes features of both a rotary-wing aircraft and of a fixed-wing aircraft. A compound aircraft may include a rotor and a wing, both of which may provide lift, and may include a thruster to provide forward thrust in addition to the forward thrust provided by the main rotor. The thruster may be a convertible thruster.

A convertible thruster is a propeller or ducted fan that can pivot between a anti-torque position and a forward thrust position. In the anti-torque position, the axis of rotation of the thruster rotor is generally normal to the longitudinal axis of the airframe. In the forward thrust position, the axis of rotation of the thruster rotor is generally coincident with the longitudinal axis of the airframe and generally passes through the aerodynamic center of the aircraft. In the forward thrust position, the convertible thruster provides forward thrust to the aircraft, as when the aircraft is flying at a high forward speed. The convertible thruster may occupy positions intermediate to the anti-torque and forward thrust positions and may provide force in those intermediate positions.

II. BRIEF DESCRIPTION OF THE INVENTION

The convertible thruster of the Invention includes a unitary electric motor and pitch control actuator, and a convertible thruster rotor having variable rotor pitch. As used herein, the term 'unitary' or 'unitized' means defining a single unit. The electric motor powers the rotation of the convertible thruster rotor, allowing electrical control of the speed of rotation of the convertible thruster rotor. The electric motor includes a motor housing and a stator enclosed within the motor housing. For redundancy and hence safety, the electric motor may include a plurality of individually operable electric motors enclosed within the same motor housing. The stator may include a plurality of sets of windings, with each of the sets of windings distributed circumferentially about the motor housing and each of the sets of windings being separately controllable through a separate variable frequency power supply. Each of the sets of windings, combined with the motor rotor, defines a separately controllable, variable speed electric motor. If one or more of the separate electric motors becomes inoperable, the remaining electric motors may continue to rotate the convertible thruster rotor. As used in this document, the term 'electric motor' means both the singular and the plural and also refers to two or more electric motors contained within the same motor housing or actuator.

The electric motor directly drives the convertible thruster rotor through a hollow motor output shaft. The motor output shaft also supports the thruster rotor and all of the forces and moments of the thruster rotor. A pitch control actuator output shaft passes through the hollow motor output shaft coaxial with the motor output shaft. Axial movement of the actuator output shaft moves one or more pitch links to change the pitch of the thruster blades of the thruster rotor.

A pitch control actuator is attached to or unitary with the electric motor and selectably propels the actuator output shaft in the axial direction to change the thruster rotor pitch. The pitch control actuator may be electromechanical and may feature two electric motors driving a common pitch control actuator output shaft for redundancy and hence safety—if one pitch control electric motor becomes inoperable, the other pitch control electric motor can move the pitch control actuator output shaft and hence control the thruster blade pitch in response to pilot commands. The concentric dual motor jack screw electromechanical actuator made by the UmbraGroup S.p.A of Foligno, Italy, is believed to be suitable.

As alternatives to the electromechanical system described above, the pitch control actuator may be hydraulic, such as a hydraulic dual piston servo attached to the pitch control actuator output shaft and hydraulically linked to inceptors moved by the pilot. The pitch control actuator may be a mechanical linkage attached to the pitch control actuator output shaft and mechanically linked to inceptors moved by the pilot.

Motion of the pitch control actuator is controlled by the movement of a mechanical actuator linkage—the movement and position of the pitch control actuator, and hence the movement and position of the pitch control actuator output shaft and the pitch of the thruster blades are determined by the movement and position of the mechanical actuator linkage. The mechanical actuator linkage is mechanically connected to inceptors operated by the pilot.

The convertible thruster pivots about a pivot hinge between the anti-torque position, the forward thrust position, and a plurality of positions intermediate to the anti-torque and forward thrust positions. In the forward thrust position, the thruster axis of rotation of the convertible thruster rotor is parallel to or coextensive with the longitudinal axis of the aircraft. In the anti-torque position, the thruster axis of rotation is normal to the longitudinal axis of the aircraft. The mechanical actuator linkage must cross the pivot hinge to inform the pitch control actuator of the pilot commands.

To cross the pivot hinge, the mechanical actuator linkage includes a transfer rod. The transfer rod is attached to and pivots with the convertible thruster about the pivot axis of the pivot hinge. The transfer rod is movable in the axial direction along the pivot axis and transfers axial motion to the pitch control actuator. The rotatable transfer rod receives axial movement along the pivot axis or rotation through a bearing from a transfer rod input member. The mechanical actuator linkage moves the transfer rod input member along the pivot axis as a result of motion of the inceptors. The transfer rod therefore pivots with the convertible thruster and moves axially in response to inceptor inputs by the pilot, providing pilot control over the convertible thruster rotor pitch for every position of the convertible thruster.

A pivot actuator moves the convertible thruster among the anti-torque, forward thrust and intermediate positions using a two-bar linkage that is in an over-center position when the convertible thruster is in the anti-torque position. Because of the over-center position of the two bar linkage, the thrust of the convertible thruster does not act upon the pivot actuator when the convertible thruster is in the anti-torque position and instead pushes the convertible thruster against a stop, keeping the convertible thruster in the anti-torque position. The over-center aspect of the two-bar linkage is a safety feature; namely, should the pivot actuator become inoperable when the convertible thruster is in the anti-torque position, the convertible thruster will remain in the anti-torque position without unintended movement of the convertible thruster.

The first bar of the two-bar linkage has rotatable connections to the aircraft fuselage and to the second bar. The second bar of the two-bar linkage has rotatable connections to the convertible thruster and to the first bar. Each of the two bars defines a bar axis between the centers of the rotatable connections of the bar. The pivot actuator acts upon the two-bar linkage between the aircraft fuselage and convertible thruster. When the convertible thruster is in the forward thrust position, the two bars are folded and the included angle between the bar axes of the two bars is an acute angle of less than 180 degrees.

When the pivot actuator moves the convertible thruster to the anti-torque position, the two bars move to the over-center position and the included angle between the two bar axes increases to an obtuse angle of more than 180 degrees. In the anti-torque position, the angle between the two bar axes proximal to the convertible thruster rotor is acute and the angle between the two bar axes distal to the convertible thruster rotor is obtuse. The combination of the obtuse angle of the two bar axes in the anti-torque position and the stop prevents the thrust of the convertible thruster from causing unintended movement of the convertible thruster about the pivot axis.

The compound aircraft may include two different pilot inceptors to control convertible thruster rotor pitch due to the two different functions served by the convertible thruster; namely, balancing main rotor torque in hover and slow speed flight, and thrust augmentation in high-speed, cruising flight. A first inceptor may be pedals to control the convertible thruster pitch when the convertible thruster is the anti-torque position. The pedals also may control a rudder for yaw control in high-speed, cruising flight. A separate inceptor such as a twist grip located on the main rotor collective pitch control lever normally located on the left side of the pilot seat may control convertible thruster rotor pitch in in high-speed, cruising flight. Any other combination of pilot inceptors to control convertible thruster rotor pitch is contemplated by the Invention.

Because two different inceptors control convertible thruster rotor pitch and because inceptors such as the pedals also may control other flight effectors, such as a rudder, a mixer moves control over the convertible thruster rotor pitch between the first and second inceptors when the convertible thruster moves between the anti-torque and forward thrust positions.

An inceptor mechanical linkage communicates from the two inceptors to the mixer. The first inceptor moves the inceptor mechanical linkage, which operates a first inceptor rod to the mixer. The second inceptor moves the inceptor mechanical linkage to move a second inceptor rod to the mixer. A feedback rod informs the mixer of whether the convertible thruster is in the anti-torque position, the forward thrust position, or a position intermediate to the anti-torque and forward thrust positions. An output rod conveys the mixed signals of the first and second inceptors to the actuator linkage, which conveys the mixed signal across the pivot hinge to the pitch control actuator, which determines the convertible thruster rotor pitch setting.

The first inceptor rod has a first inceptor line of action within the mixer and the second inceptor rod has a second inceptor line of action within the mixer. The first and second inceptor lines of action are parallel to each other in a spaced-apart relation and together define a mathematical plane. The output rod has an output line of action parallel to and intermediate between the first and second inceptor lines of action and coincident with the mathematical plane. The first and second inceptor rods have a rotatable connection to a rocker disposed within the mixer body so that differential positions of the first and second inceptors will cause the rocker to tilt within the mixer body.

A connecting rod has two ends. One end of the connecting rod is attached to the output rod by a rotatable connection. The second end of the connecting rod is connected to the rocker by a sliding connection so that the second end of the connecting rod may slide between the first inceptor line of action and the second inceptor line of action. When the second end of the connecting rod is aligned with the first inceptor line of action, motion of the first inceptor by the pilot will move the first inceptor rod, which will move the rocker, which will move the second end of the connecting rod, which will move the output rod to control convertible thruster rotor pitch. When the second end of the connecting rod is aligned with the first inceptor line of action, motion of the second inceptor by the pilot will move the rocker, but will not move the connecting rod and will not move the output rod and will not affect convertible thruster rotor pitch.

When the second end of the connecting rod is aligned with the second inceptor line of action, motion of the second inceptor by the pilot will move the second inceptor rod, which will move the rocker, which will move the second end of the connecting rod, which will move the output rod to control convertible thruster rotor pitch. When the second end of the connecting rod is aligned with the second inceptor line of action, motion of the first inceptor by the pilot, as by input to the yaw pedals, will move the rocker, but will not move the connecting rod and will not move the output rod and will not affect convertible thruster rotor pitch.

The feedback rod moves a lifting link generally normal to the output rod line of action. The lifting link engages the connecting rod and moves the second end of the connecting rod between the first inceptor line of action and the second inceptor line of action. The position of the feedback rod depends upon whether the convertible thruster is in the anti-torque position, the forward thrust position or an intermediate position, as detected by a feedback linkage.

In operation, the electric motor and pitch control actuator will generate heat. When the aircraft is cruising at high speed in the forward direction, the flow of ambient air over the convertible thruster is adequate to cool the electric motor. When the convertible thruster is in the anti-torque position in hover or low speed flight, the flow of ambient air may not be sufficient. A coaxial fan located circumferentially about the electric motor may provide additional cooling air when the convertible thruster is in the anti-torque position. The coaxial fan is driven by the electric motor through a gearbox. The gearbox includes a clutch. The clutch is normally engaged to drive the fan but may be disengaged by a clutch lever when the convertible thruster moves to the forward thrust position. The normally-engaged clutch is a safety feature, providing that the cooling fan will continue to operate if the fan disengagement mechanism does not operate as expected. Disengaging the cooling fan when the convertible thruster is in the forward thrust position is an efficiency measure, freeing the energy used to drive the fan for other purposes, such as propelling the aircraft.

The cooling fan also may be thermally controlled. A thermal material such as aluminum having a high coefficient of thermal expansion may be in thermal engagement with the stator of the electric motor. When the thermal material shrinks by a predetermined amount indicating that the temperature of the stator is below a desired deactivation temperature, the thermal material may cause the clutch to disengage or otherwise cause the fan to stop turning. When the temperature rises above the deactivation temperature, the clutch re-engages and the fan rotates to cool the electric motor and pitch control actuator.

III. BRIEF DESCRIPTION OF THE DRAWINGS

FIG. 1 if a perspective view of the compound aircraft with the convertible thruster in the anti-torque position.

FIG. 12 is a detail perspective view of the transfer rod, transfer rod linkage and pitch control actuator in the anti-torque position.

FIG. 13 is a detail perspective view of the transfer rod, transfer rod linkage and pitch control actuator in the forward thrust position.

IV. DESCRIPTION OF AN EMBODIMENT

Figure 1:
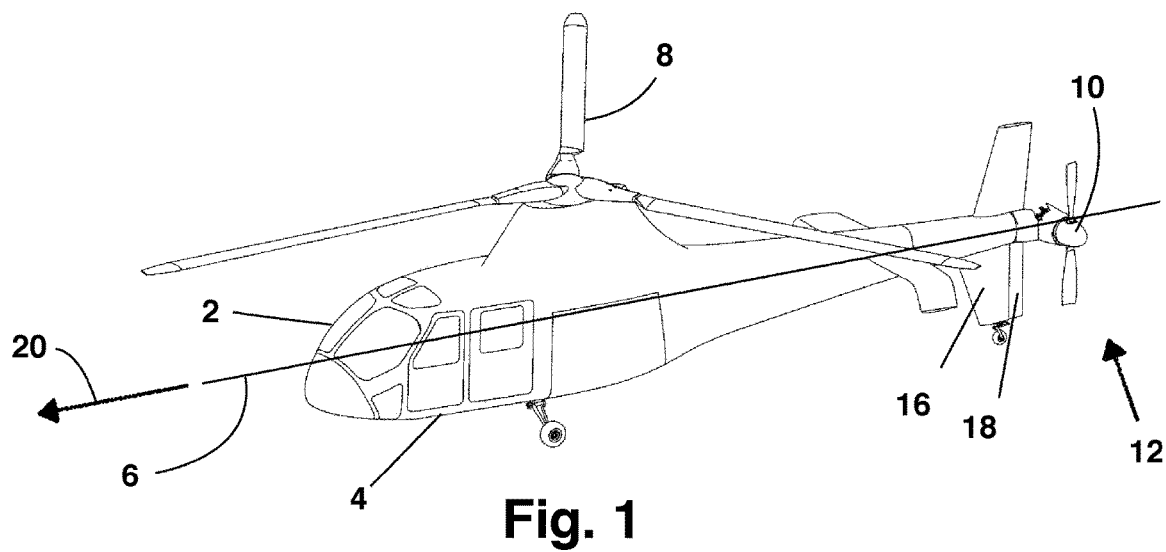
Figure 2:
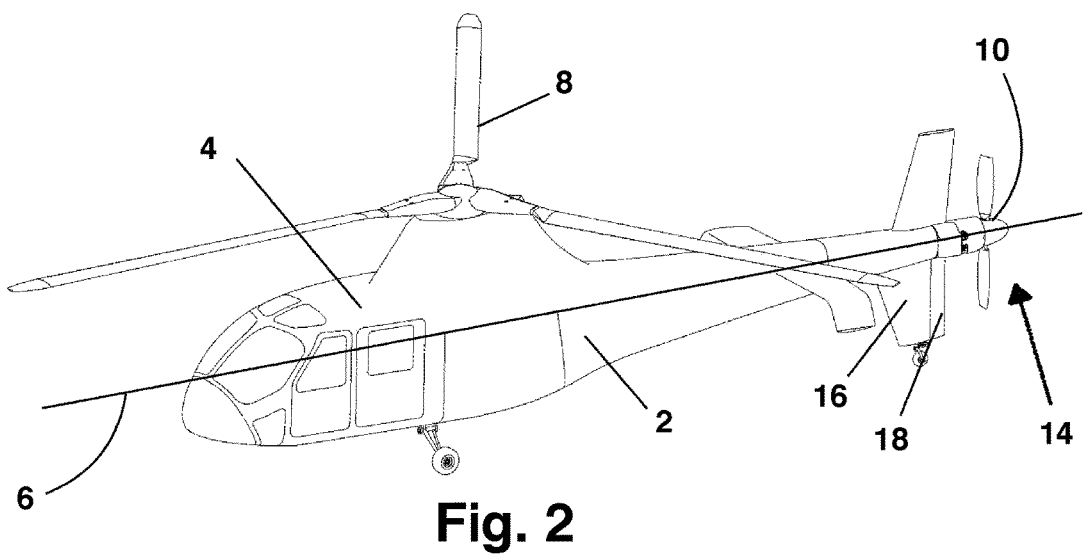
FIG. 2 is a perspective view of the compound aircraft with the convertible thruster in the forward thrust position.

The Invention is a compound aircraft 2, shown by the perspective views of FIGS. 1 and 2. The compound aircraft 2 has a fuselage 4 that defines an aircraft longitudinal axis 6. The compound aircraft 2 has a main rotor 8 for lift and propulsion and a convertible thruster 10. The convertible thruster 10 pivots between an anti-torque position 12, shown by FIG. 1, and a forward thrust position 14, shown by FIG. 2. In the anti-torque position 12, thrust from the convertible thruster 10 balances the torque of the main rotor 8 during hover and low-speed flight. In the forward thrust position 14 the thrust of the convertible thruster 10 provides additional propulsion to the compound aircraft 2 in the forward direction 20. The convertible thruster 10 also may occupy a plurality of positions intermediate to the anti-torque position 12 and forward thrust position 14.

From FIGS. 1 and 2, the compound aircraft 2 may include a vertical stabilizer 16 and a rudder 18. The rudder 18 may be movable under the control of the pilot. The vertical stabilizer 16 and rudder 18 provide yaw control to the compound aircraft 2 when the compound aircraft i2 is moving at a high speed in the forward direction 20. The compound aircraft 2 may include wings, not shown, to provide lift to supplement the lift of the main rotor 8 when the compound aircraft 2 is moving at high speed in the forward direction 20.

Figure 3:
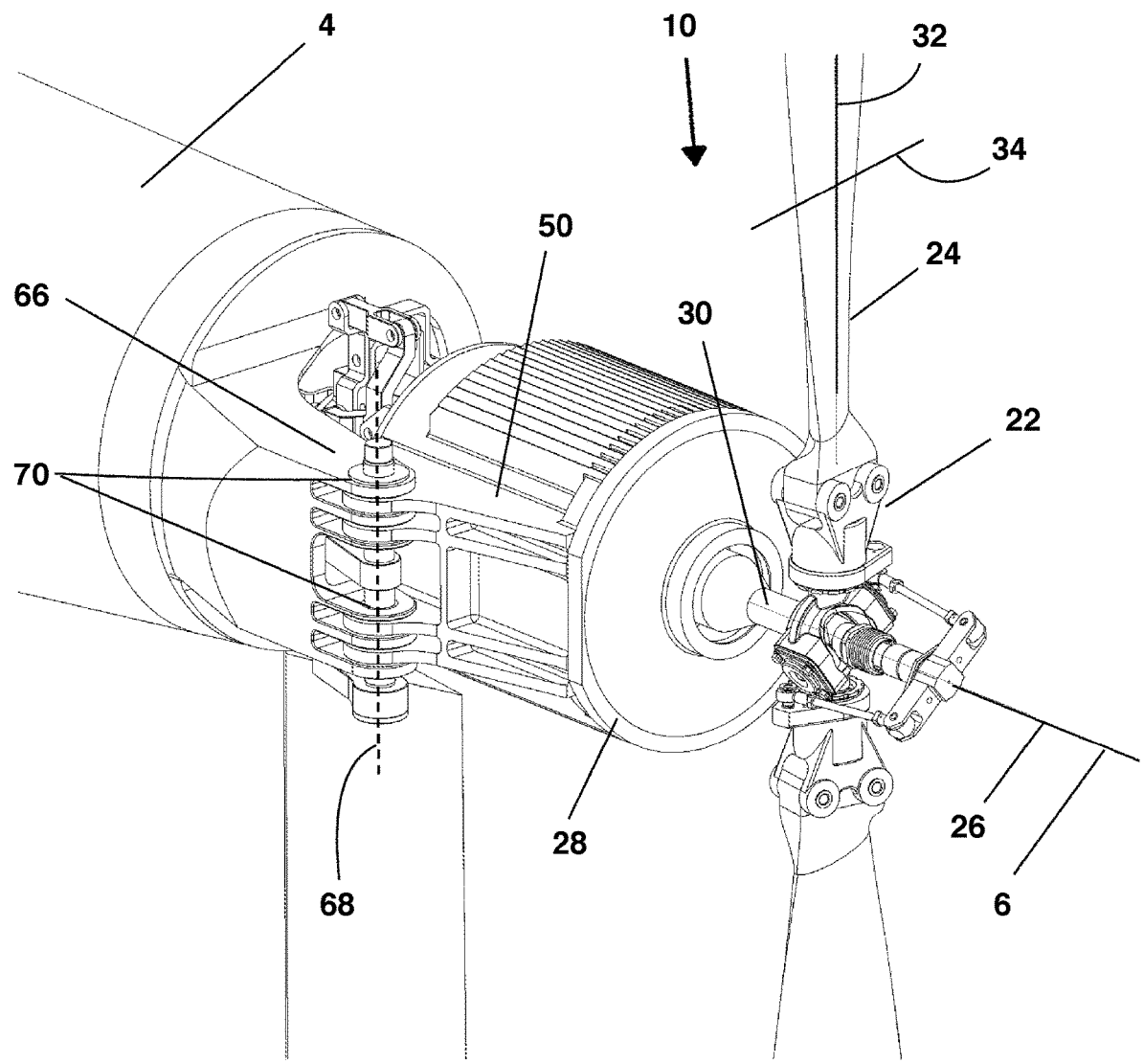
FIG. 3 is a perspective view of the convertible thruster with housings removed.

FIG. 3 is a detail perspective view of the convertible thruster 10 with a thruster housing, cooling fan (described below relating to FIGS. 25-35), and related components removed for clarity. The convertible thruster 10 includes a thruster rotor 22 that may define a propeller or ducted fan. The thruster rotor 22 rotates about a thruster axis of rotation 26. When the convertible thruster 10 is in the forward thrust position 14 as shown by FIGS. 2 and 3, the thruster axis of rotation 26 is parallel to or collinear with the aircraft longitudinal axis 6. When the convertible thruster 10 is in the anti-torque position, the thruster axis of rotation is normal to the aircraft longitudinal axis 6.

From FIG. 3, an electric motor 28 rotates the thruster rotor 22 through a motor output shaft 30. The thruster rotor 22 include thruster blades 24 that are of variable pitch. The thruster blades 24 are attached to and rotate with the motor output shaft 30. Each thruster blade 24 defines a span axis 32 and a chord axis 34. The thruster blades 24 are rotatable with respect to the thruster rotor 22 about the span axis 32, which changes the angle of the chord axis 34 with respect to the thruster axis of rotation 26 and changes the angle of attack of the thruster blades 24. The pilot can adjust the thrust produced by the convertible thruster 10 by adjusting the speed of rotation of the motor 28 or by adjusting the pitch of the thruster blades 24.

Figure 4:
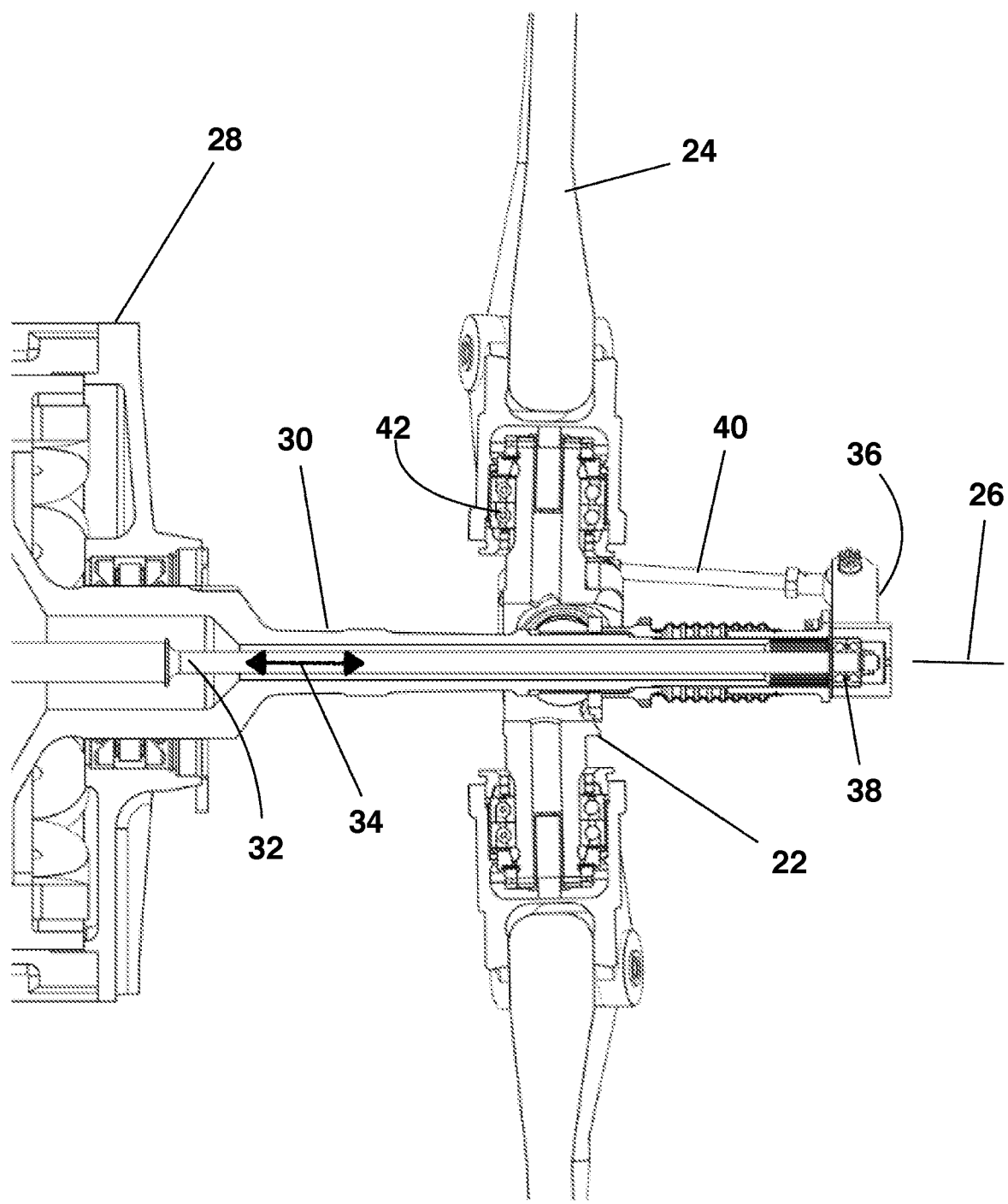
FIG. 4 is a detail cross section of the thruster rotor.

FIG. 4 is a detail cross section of thruster rotor 22 showing the mechanism for adjusting thruster blade 24 pitch. The motor output shaft 30 is hollow. A pitch control actuator output shaft 32 is disposed within the motor output shaft 30 and is moveable in the axial direction 34 within the motor output shaft 28. The pitch control output shaft 32 acts upon crosspiece 36 through crosspiece bearing 38 and moves crosspiece 36 in the axial direction 34. Crosspiece 36 rotates with the thruster rotor 22 and moves pitch links 40 in the axial direction 34. The pitch links 40 cause thruster blades 24 to rotate about the blade bearings 42, changing the pitch of the variable pitch thruster blades 24. The blade bearings may be ball bearings, as illustrated by FIG. 4, or may be torsionally elastic bearings.

Figure 5:
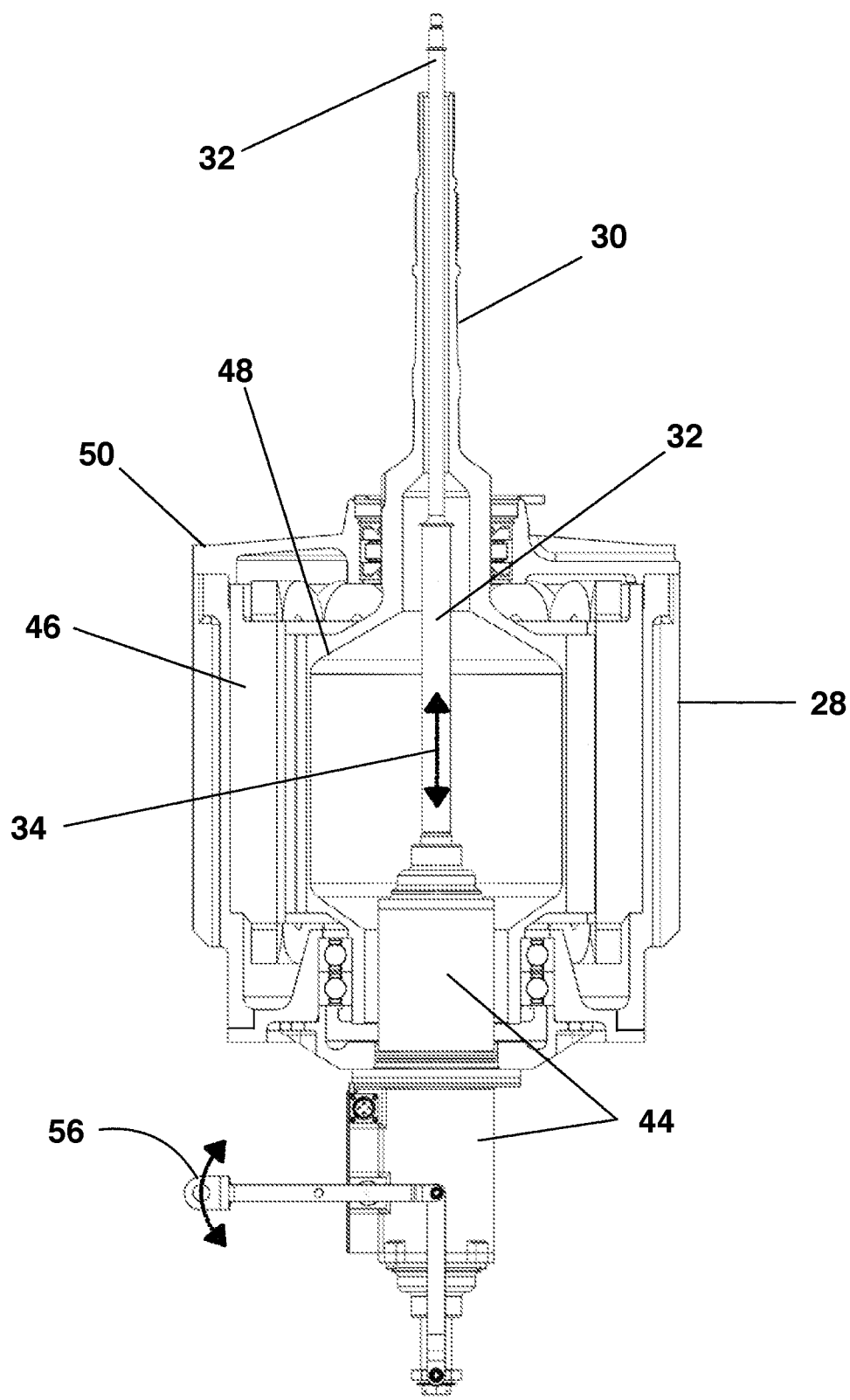
FIG. 5 is a cross section of the unitary electric motor and pitch control actuator.

FIG. 5 is a section view of the unitary electric motor 28 and pitch control actuator 44. The electric motor 28 may be a three-phase AC motor 28 provided electricity by a variable frequency power supply. The variable frequency power supply allows the pilot to change the speed of rotation of the thruster rotor 22 by changing the frequency of the electric power to the electric motor 28. The electric motor 28 has a stator 46 and an electric motor rotor 48 enclosed within a motor housing 50. The stator 46 includes windings 52 (FIG. 6) to generate a rotating magnetic field. The electric motor rotor 48 includes permanent magnets 54. The rotating magnetic field of the stator propels the magnets 54 and hence the electric motor rotor 48.

Figure 6:
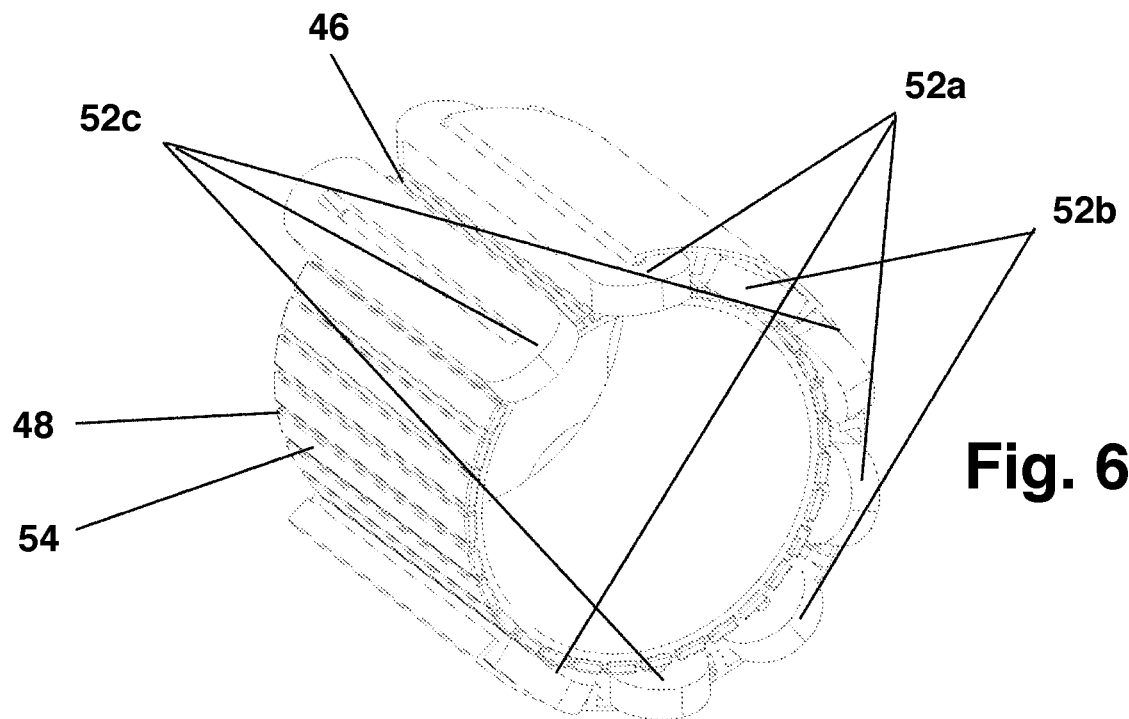
FIG. 6 is a detail view of the electric motor stator.

FIG. 6 is a partial cutaway view of the stator 46 and electric motor rotor 48. As shown by FIG. 6, the electric motor may include a plurality of sets of windings (52a, 52b, 52c) with each set of windings 52a, 52b, 52c distributed about the circumference of the stator 46. Each of the sets of windings 52a, 52b, 52c may be provided power by a separate variable frequency inverter and each of the sets of windings 52a, 52b, 52c along with the motor rotor defines a separate three-phase electric motor 28. The multiple separate electric motors 28 in a single housing 50 is a safety feature-in the event any of the separate three-phase electric motors 28 becomes inoperable, the remaining three-phase electric motors 28 can continue to rotate the thruster rotor 22. Although FIG. 6 shows three sets of windings 52a, 52b, 52c, any number of sets of windings is contemplated by the Invention.

Figure 7:
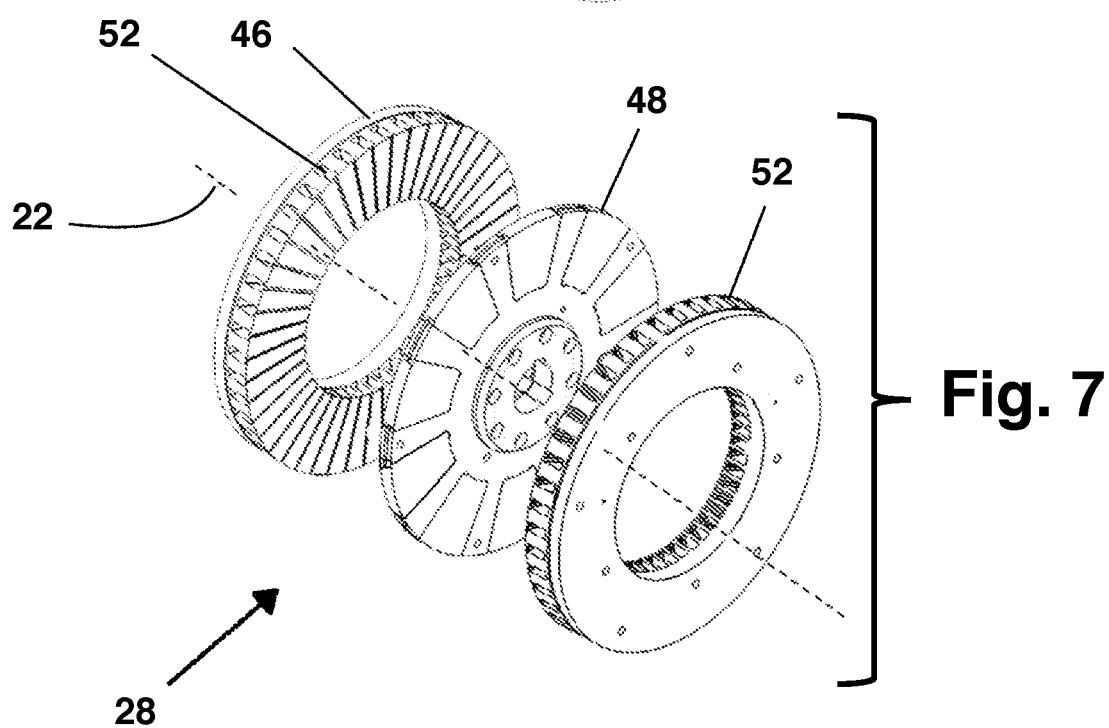
FIG. 7 is an exploded view of a radially oriented electric motor.

As shown by the exploded view of FIG. 7, the electric motor 28 may be axially oriented, and multiple sets of windings 52 may be radially disposed about the stator 46.

Figure 8:
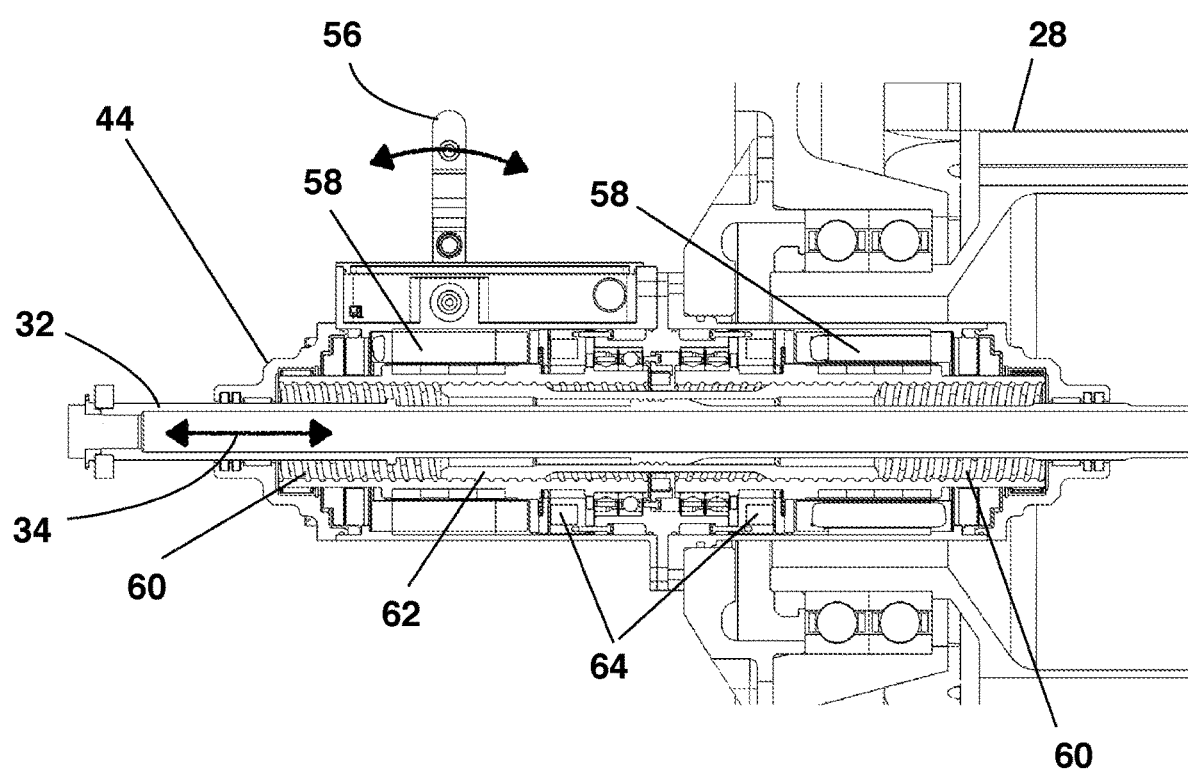
FIG. 8 is a cross section of one possible pitch control actuator.

FIGS. 5 and 8 show one embodiment of the pitch control actuator 44 and its relation to the electric motor 28. As shown by FIGS. 5 and 8, the pitch control actuator 44 may be unitary with the electric motor 28 and disposed partially or completely within the electric motor rotor 48 for axial compactness. A pitch control actuator input lever 56 has a hinged connection to the pitch control actuator 44. Mechanical deflection of the pitch control actuator input lever 56 either toward or away from the thruster rotor 22 causes the pitch control actuator 44 to move the pitch control actuator output shaft 32 either toward or away from the thruster rotor 22, changing the pitch of the thruster blades 24. The pitch control actuator 44 may be any other linear actuator having a mechanical input, including a pitch control actuator comprising a mechanical linkage and a pitch control actuator comprising a hydraulic actuator.

The pitch control actuator 44 of the example of FIG. 8 is electromechanical and has two pitch control actuator electric motors 58. The two pitch control actuator electric motors 58 provide redundancy and are a safety feature. If any one pitch control actuator electric motor 58 should become inoperable, the other motor 58 can continue to move the pitch control actuator output shaft 32 in response to motion of the pitch control actuator input lever 56. In the example of FIG. 8, each motor 58 rotates a ball screw 60, with the two ball screws 60 having opposite thread pitches. The ball screws 60 engage an intermediate screw shaft 62. The intermediate screw shaft 62 has external threads that engage the balls crews 60 and internal threads that engage the pitch control actuator output shaft 32. Each motor 58 is locked by a brake 64 when not operating. When rotating in the same direction, the motors 58 rotate the intermediate screw shaft 62. The threaded engagement between the intermediate screw shaft 62 and the pitch control actuator output shaft 32 moves the pitch control output shaft 32 in the axial direction 34. When the motors 58 rotate in opposite directions at the same speed, the intermediate screw shaft 62 moves in the axial direction 34 without rotating and carries along the pitch control actuator output shaft 32. If one of the motors 58 becomes inoperable, the associated brake 64 remains locked. The functioning motor 58 rotates the associated ball screw 60 and moves the intermediate screw shaft 62, which induces motion in the axial direction 34 in the pitch control actuator output shaft 32.

Figure 9:
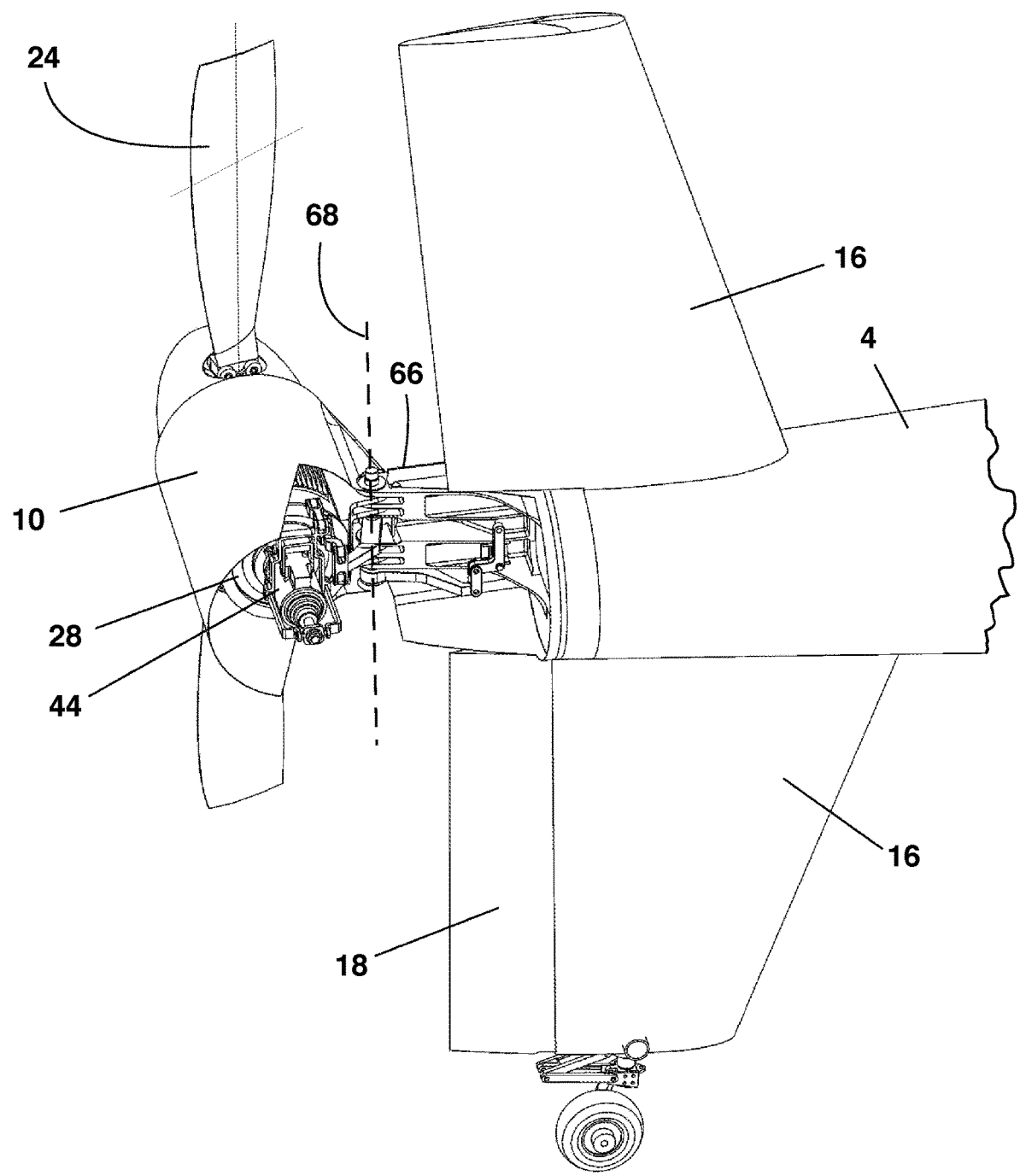
FIG. 9 is a detail perspective view of the compound aircraft and convertible thruster in the anti-torque position.
Figure 10:
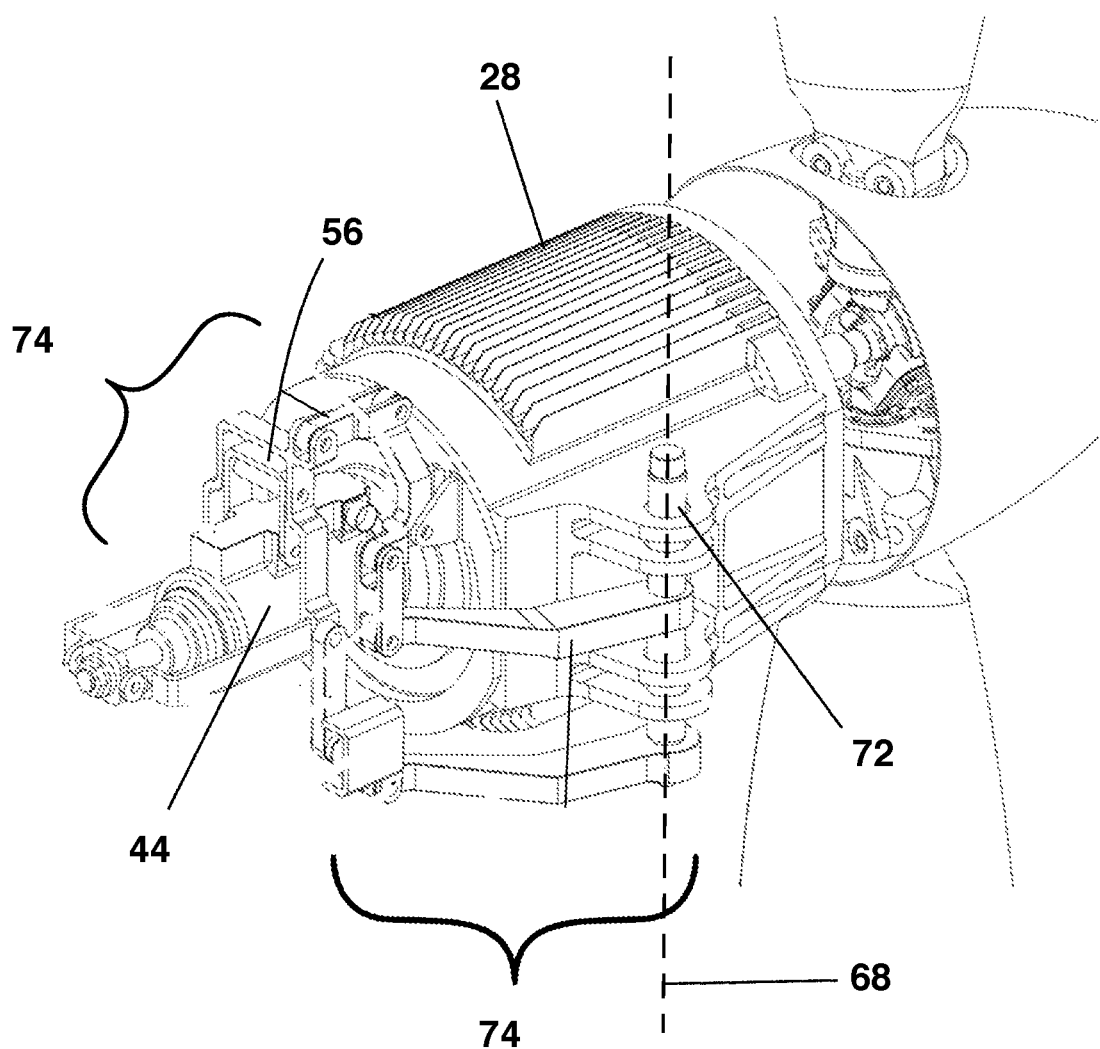
FIG. 10 is a detail perspective view of the transfer rod and transfer rod linkage on the convertible thruster.
Figure 11:
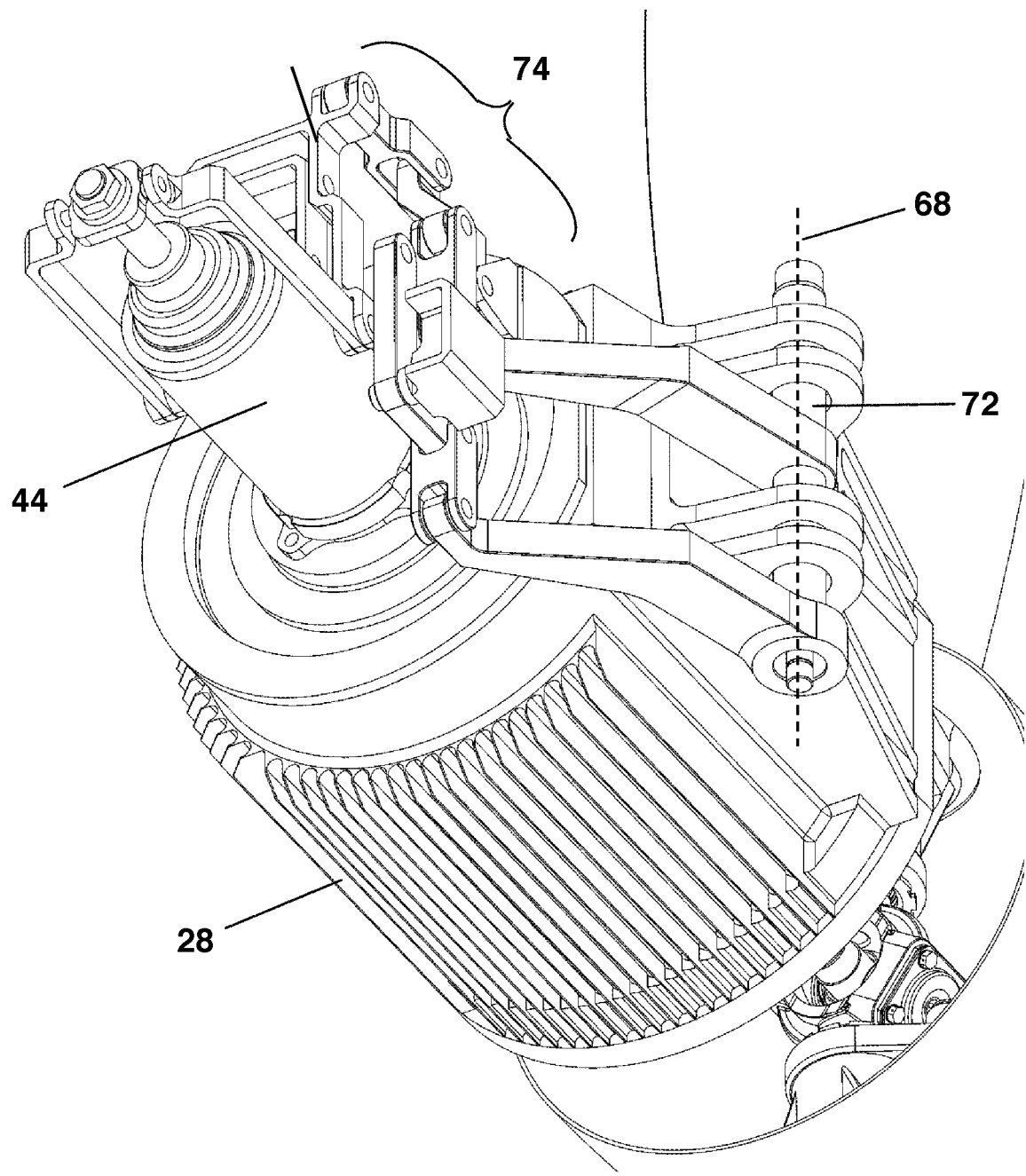
FIG. 11 is a second perspective view of the transfer rod and transfer rod linkage on the convertible thruster.

FIGS. 3 and 9 through 16 address the pivot hinge 66 about which the convertible thruster 10 pivots and the mechanism by which the convertible thruster rotor pitch signal from the pilot crosses the pivot hinge 66 to reach the pitch control actuator 44. As best seen in FIGS. 3 and 9, the motor housing 50 is rotatably attached to the fuselage 4 by the pivot hinge 66. The convertible thruster 10 pivots about hollow pins 70 between the anti-torque position 12, the forward thrust position 14, and intermediate positions to define a pivot axis 68. Transfer of pilot commands to the pitch control actuator input lever 56 is complicated by the multiple positions of the convertible thruster 10—the thruster rotor pitch control instruction must cross the pivot hinge 66 for every position of the convertible thruster 10.

From FIGS. 10 through 16, the mechanical rotor pitch control signal crosses the pivot hinge 66 by the motion of a transfer rod 72. The transfer rod 72 may be coaxial with the convertible thruster pivot axis 68 and may pass through the hollow pins 70. The transfer rod 72 is movable axially along the convertible thruster pivot axis 68. The transfer rod 72 is attached to a transfer rod linkage 74 that moves mechanically in response to motion of the transfer rod 72 and conveys the motion of the transfer rod 72 to the pitch control actuator input lever 56. One possible transfer rod mechanical linkage 74 is shown by FIGS. 10 through 15.

Figure 14:
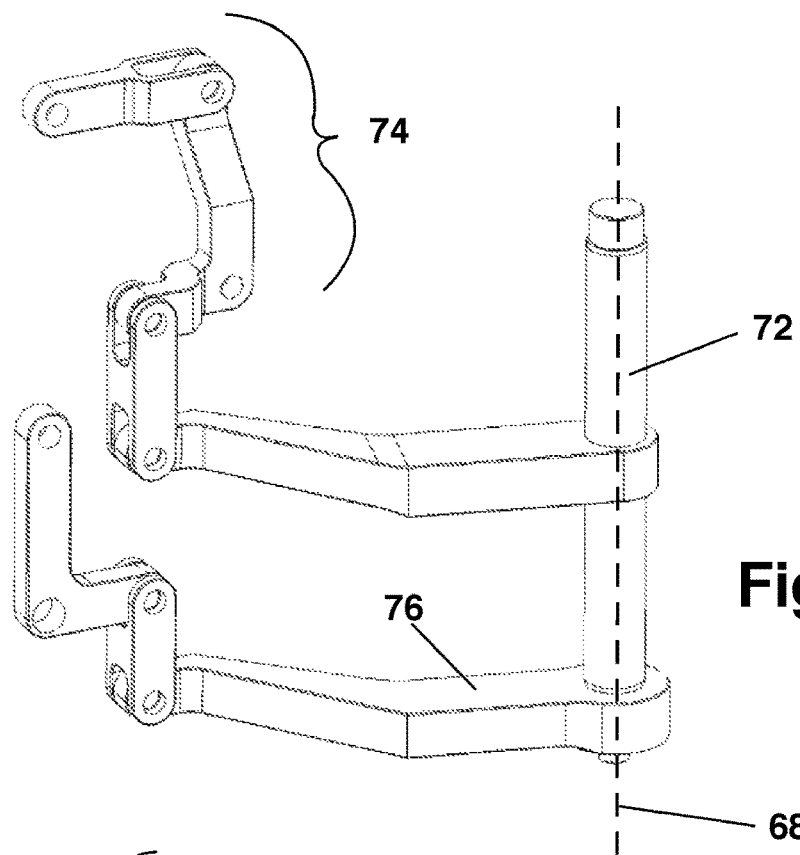
FIG. 14 is a detail perspective view of the transfer rod and transfer rod linkage.
Figures 15, 16:
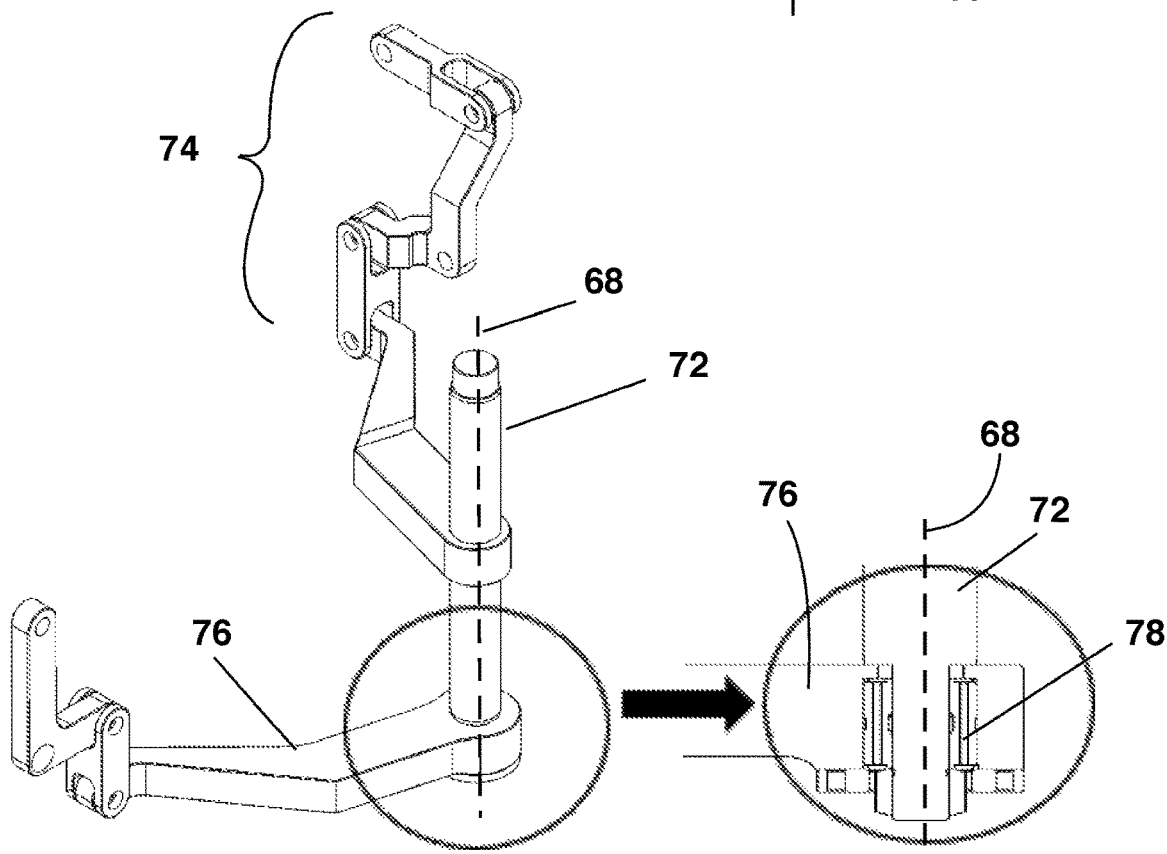
FIG. 15 is a second detail perspective view of the transfer rod and transfer rod linkage.
FIG. 16 is a cross sectional view of the detail indicated on FIG. 15 showing the transfer rod bearing.

FIGS. 12 and 13 show the transfer rod 72, pitch control actuator 44 and pitch control actuator linkage with the electric motor 28 and pivot hinge 66 removed. FIG. 12 shows the transfer rod 72 when the convertible thruster 10 is in the anti-torque position 12. FIG. 13 shows the transfer rod 72 when the convertible thruster 10 is in the forward thrust position 14. FIGS. 14 and 15 are detail perspective views of the transfer rod 72 and transfer rod linkage 74 with all other components removed. FIG. 14 shows the transfer rod 72 in the forward thrust position 14, while FIG. 15 shows the transfer rod 72 in the anti-torque position 12.

From FIGS. 14 and 15, the transfer rod 72 pivots with the convertible thruster 10, but the transfer rod input member 76 does not. FIG. 16 is a cross section of the indicated detail of FIG. 15. A transfer rod bearing 78, such as a ball or roller bearing, joins the transfer rod input member 76 and the input rod 72, allowing the transfer rod 72 to pivot with respect to the transfer rod input member 76.

Figure 17:
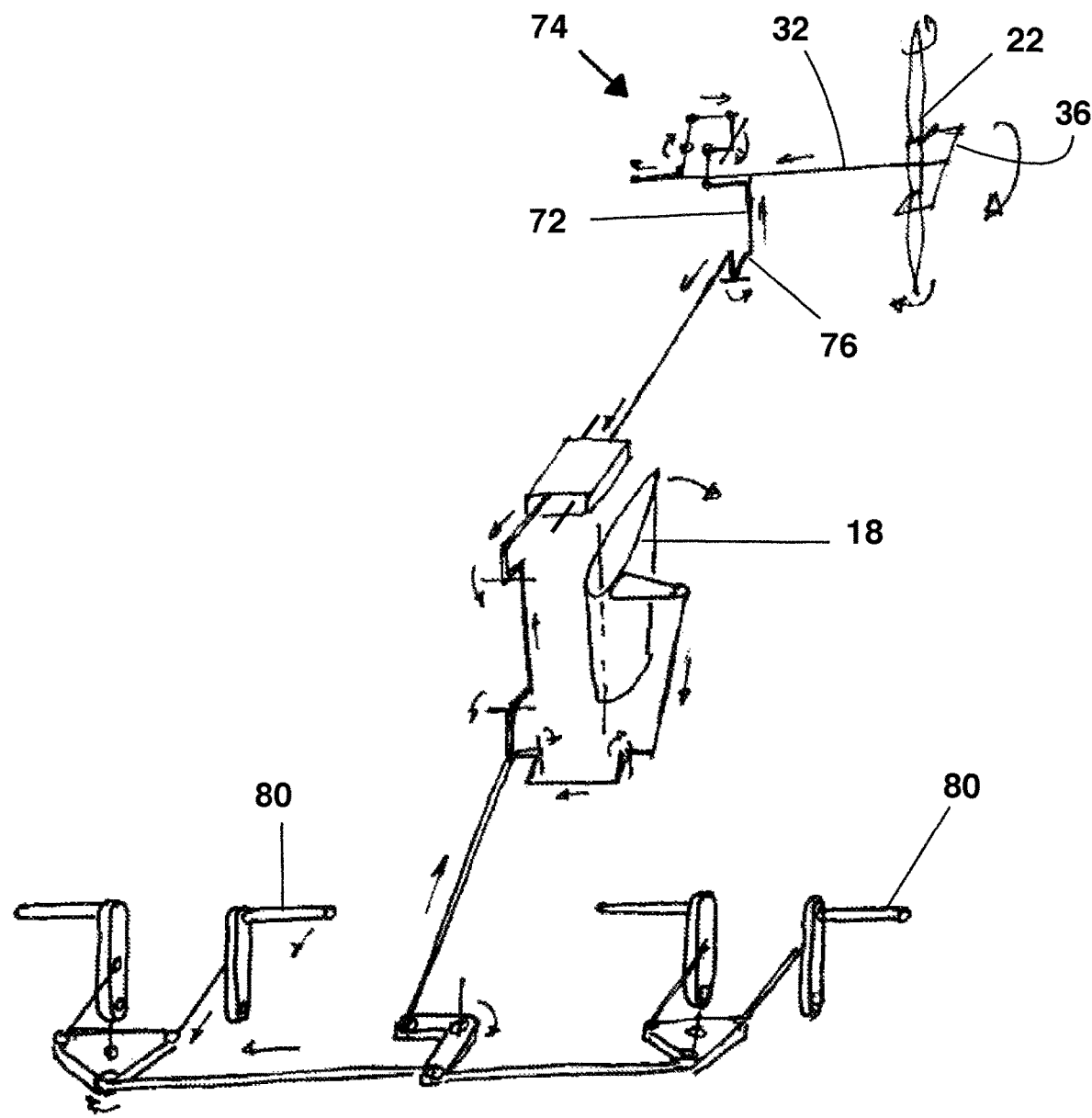
FIG. 17 is a schematic diagram of the mechanical control system for the first inceptor.
Figure 18:
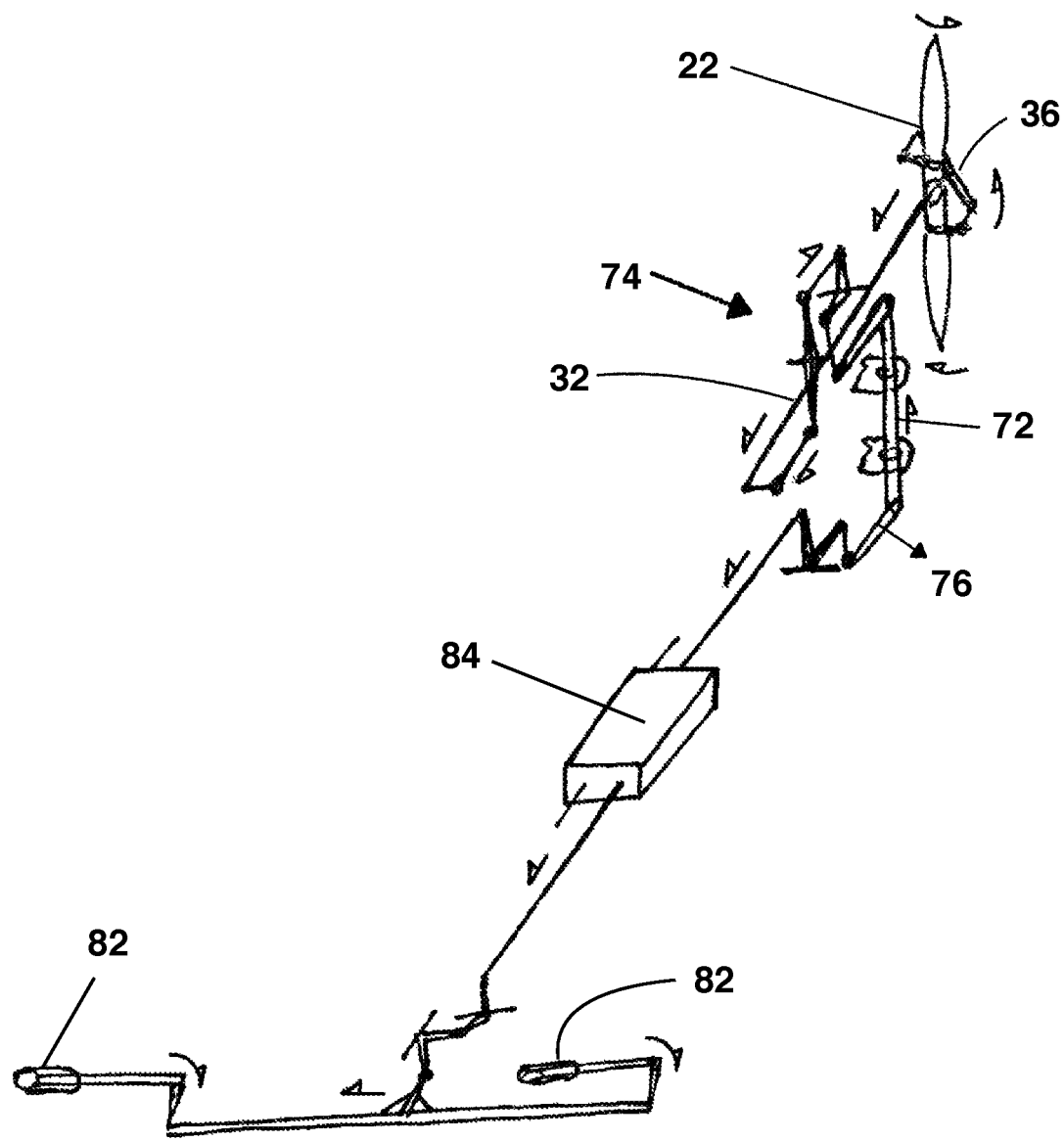
FIG. 18 is a schematic diagram of the mechanical control system for the second inceptor.
Figure 19:
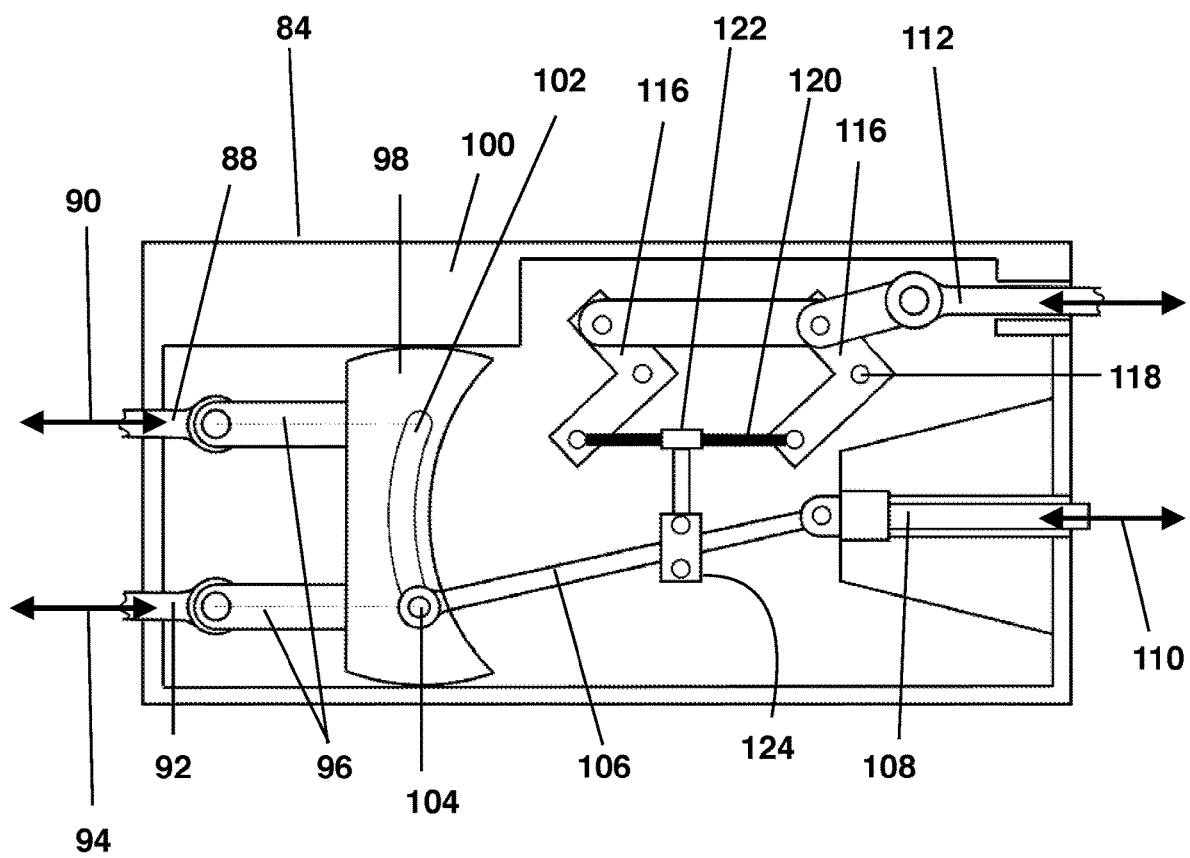
FIG. 19 is a plan view of a mixer.

FIGS. 17, 18 and 19 illustrate the movement of a pilot command to change thruster rotor 22 pitch from the inceptors 80, 82 to the transfer rod input member 76. The convertible thruster 10 performs two different functions in operation; namely, balancing main rotor 8 torque in hover and slow speed flight and thrust augmentation in high-speed flight. As a result, the pilot has two separate sets of inceptors 80, 82 to control the pitch of the thruster rotor blades 24 in the two operating conditions. As shown by FIG. 17, the first inceptors 80 may be pedals. The first inceptors 80 control the thruster rotor 22 pitch when the convertible thruster 10 is in the anti-torque position 12.

As shown by FIG. 18, a second inceptor 82 may be a twist grip located on the main rotor 8 collective pitch control lever, which is normally located on the left side of the pilot seat. The second inceptor 82 controls thruster rotor 22 pitch when the convertible thruster 10 is in the forward thrust position 14, as during high speed flight. Any other inceptors 80, 82 may be used for the first and second inceptors 80, 82. From FIGS. 17 and 18, the inceptors 80, 82 move mechanical elements such as rods, bell cranks, cables or chains to transmit the thruster rotor pitch control signal mechanically from the inceptors 80, 82 to the pitch control actuator input lever 56.

Because the inceptor 80, 82 assigned to control thruster rotor 22 pitch changes with the position of the convertible thruster 10, a mixer 84 smoothly transitions control input between the inceptors 80, 82 without intervention by the pilot when the convertible thruster 10 moves between the anti-torque and forward thrust positions 12, 14.

The mixer 84 is shown by FIG. 19. The mixer 84 receives a first inceptor mechanical signal and a second inceptor mechanical signal from the first and second inceptors 80, 82 through a mechanical inceptor linkage. Motion of the first inceptor 80, such as the rudder pedals, by the pilot moves the first inceptor input link 88 along the first input line of action 90. Motion of the second inceptor 82 moves the second input link 92 in second input line of action 94. While the first and second inceptors 80, 82 may be the rudder pedals and a twist grip, any other inceptor may serves as the first or the second inceptor 80, 82. The mixer 84 blends the two signals to a mixer mechanical output signal, as described below, and transmits the mixer output signal to the pitch control actuator 44 through a pitch control actuator mechanical linkage.

From FIG. 19, the first and second inceptor input links 88, 92, and hence the first and second inceptors 80, 82, are connected by intermediate links 96 to rocker 98. Differential positions of the first and second inceptor input links 88, 92 will cause rocker 98 to tilt. The ends of rocker 98 are curved so that the rocker 98 may tilt within the mixer body 100 without interference from the mixer body 100. The rocker 98 defines a curved slot 102 that a follower 104 slideably engages. The follower 104 is connected to a connecting rod 106 and pushes or pulls the connecting rod 106. The radius of curvature of the curved slot 102 is equal to the length of the connecting rod 106. The connecting rod 106 is attached to the output rod 108 by a hinged connection. Motion of the connecting rod 106 will move the output rod 108 along the output rod line of action 110, which will instruct the pitch control actuator 44 as to the commanded pitch of the thruster rotor blades 44.

The first input line of action 90 and the second input line of action 94 are parallel and together define a mathematical plane. The output line of action 110 is parallel to the first and second input lines of action 90, 94 and coincident with the mathematical plane. The output line of action is intermediate to the first and second input lines of action 90, 94 on the mathematical plane.

The position of the follower 104 in the slot 102 determines whether the first inceptor 80 or the second inceptor 82 is operably connected to the output rod 108 or whether a blend of the positions of the first and second inceptors 80, 82 determines the position of the output rod 110. In example of FIG. 19, the follower 104 is aligned with the second input line of action 94 corresponding to the twist grip for high-speed flight. All of the motion of the second inceptor 82 is translated through input link 92, through rocker 98, through the follower 104, through the connecting rod 106 to the output rod 108. In the example of FIG. 19, none of the motion of the first inceptor 80 (the pedals for low-speed or hovering flight) and first inceptor input link 88 are translated to the output rod 108.

From FIG. 19, the position of the feedback input link 112 determines the position of the follower 104 in the slot 102 and therefore how much of the control over the convertible thruster rotor 22 pitch is allocated to the first inceptor 80 and how much control is allocated to the second inceptor 82. The position of the feedback input link 112 is determined by the angular position of the convertible thruster 10—if the convertible thruster pivots to the forward thrust position 14, a feedback mechanical linkage 114 (shown by FIGS. 21, 22, and 23) moves the feedback input link 112 to allocate control to the second inceptor 82. If the convertible thruster is in the anti-torque position 12, the feedback feedback input link 112 moves to allocate control to the first inceptor 82. If the convertible thruster 10 is in a position intermediate to the forward thrust and anti-torque positions 14, 12, the feedback mechanical linkage 114 moves the feedback input link 112 to blend control between the first and second inceptors 80, 82.

In the example of FIG. 19, the feedback input link 112 rotates two mixer bell cranks 116 about bell crank hinges 118. A bell crank rod 120 rises or falls (in FIG. 19) parallel to the first input line of action 90, the second input line of action 92 and the output rod line of action 110 and based on the rotational position of the mixer bell cranks 116 and hence on the position of the feedback input link 112. A slider 122 slides on the bell crank rod 120 and is attached to a lifting link 124. The lifting link 124 raises or lowers the connecting rod 106 based on the position of the feedback input link 112. As the feedback input link 112 raises the connecting rod 106, control passes from the second inceptor input link 92 to the first inceptor input link 88. When the feedback input link 112 lowers the connecting rod 106, control passes from the first inceptor input link 88 to the second inceptor input link 92. In an intermediate position, control is mixed between the first and second input links 88, 92, and hence between the first and second inceptors 80, 82.

Figure 20:
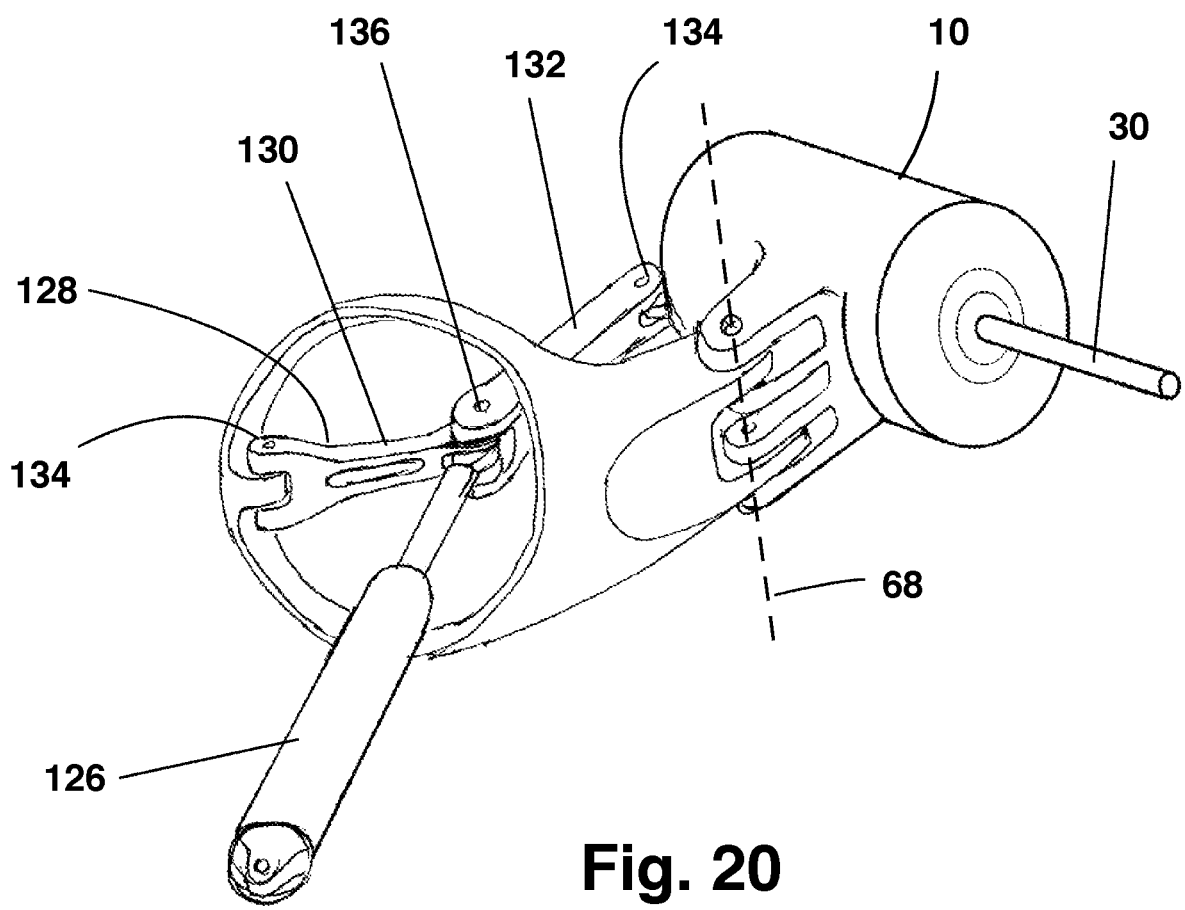
FIG. 20 is a perspective view of the convertible thruster and two-bar linkage.

FIGS. 20 through 24 illustrate the mechanism to pivot the convertible thruster 10 between the anti-torque and forward thrust positions 12, 14. FIG. 20 is a perspective view of the convertible thruster 10 removed from the aircraft 2. The convertible thruster 10 includes a pivot actuator 126. The pivot actuator 126 may be controlled by a switch operated by the pilot. One end of the pivot actuator 126 is attached to the fuselage 4 of the aircraft 2. The other end of the pivot actuator 126 is attached to a two-bar pivoting linkage 128 having a first bar 130 and a second bar 132. Each bar has a first end 134 and a second end 136. The first end 134 of the first bar 130 is attached to the fuselage 4 in a spaced apart relation to the pivoting axis 68. The first end 134 of the second bar 132 is attached to the convertible thruster 10 in a spaced apart relation to the pivot axis 68. The second end 136 of both bars 130, 132 are attached together. All connections are hinged so that the bars 130, 132 may fold under the control of the pivot actuator 126 between the forward thrust position 14, shown by FIG. 21, the anti-torque position 12 shown by FIG. 23, and the intermediate positions, represented by FIG. 22.

Figure 21:
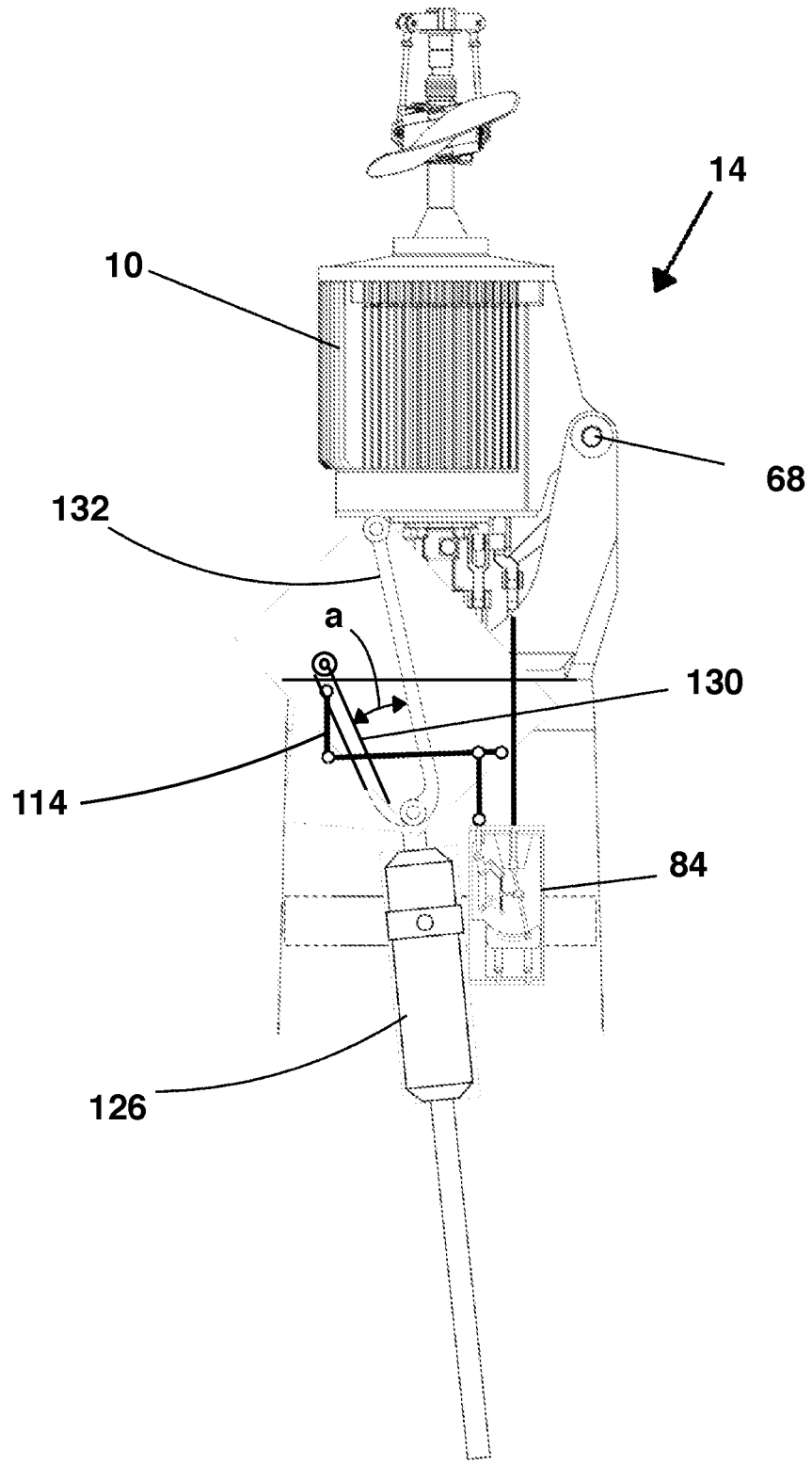
FIG. 21 is a plan view of the pivot actuator and two-bar linkage with the convertible thruster in the forward thrust position.
Figure 22:
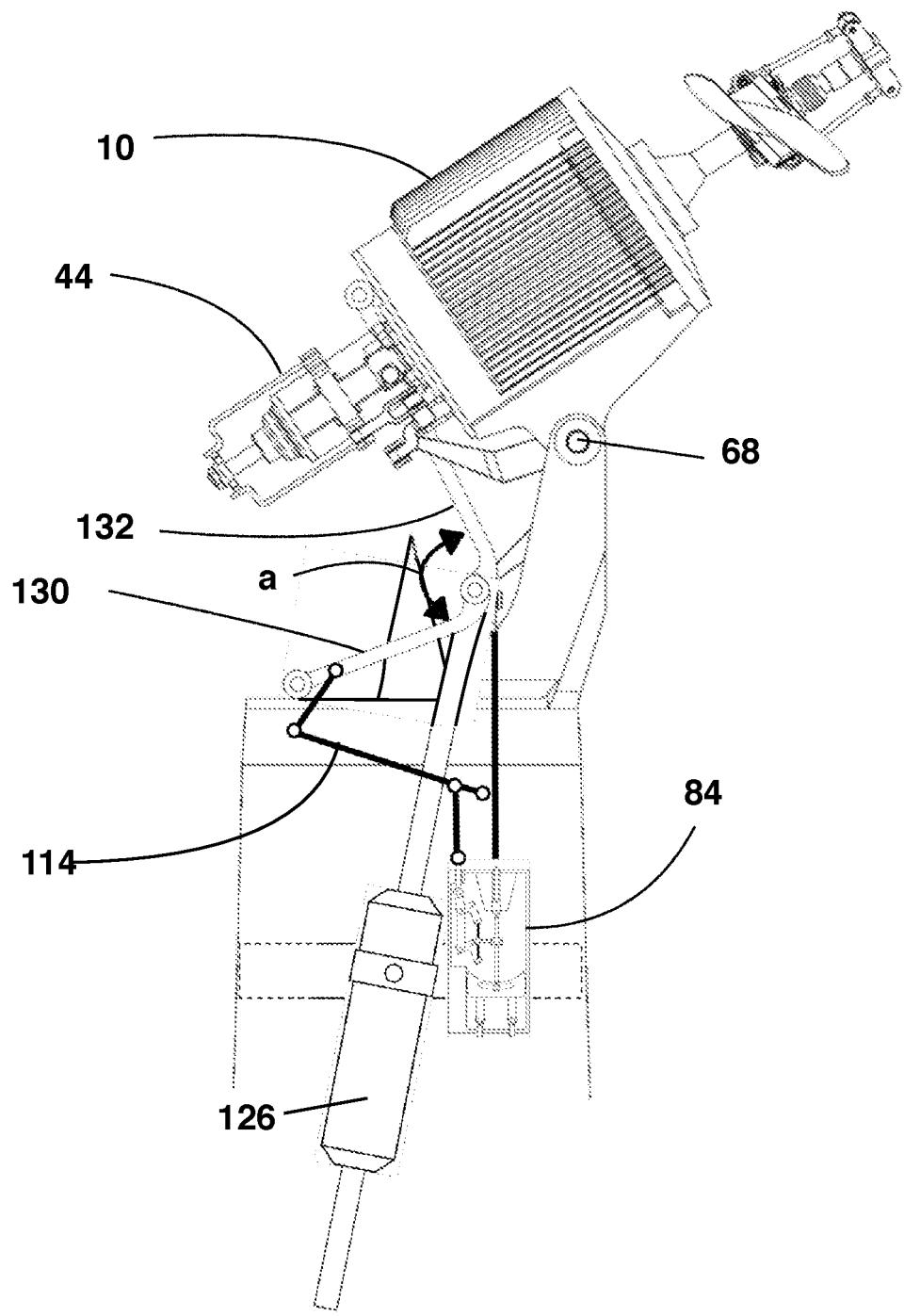
FIG. 22 is a plan view of the pivot actuator and two-bar linkage with the convertible thruster in an intermediate position.
Figure 23:
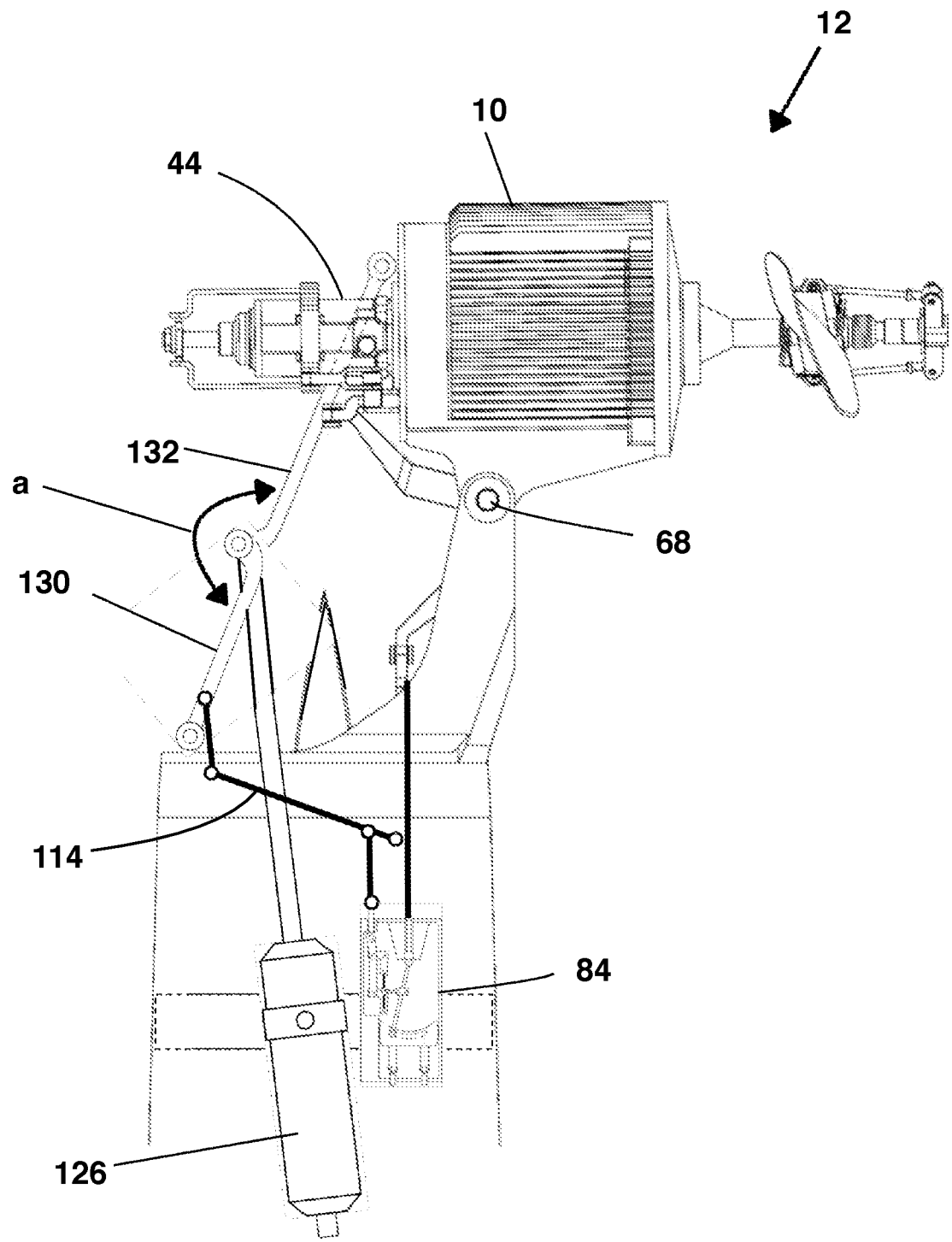
FIG. 23 is a plan view of the pivot actuator and two-bar linkage with the convertible thruster in the anti-torque position.
Figure 24:
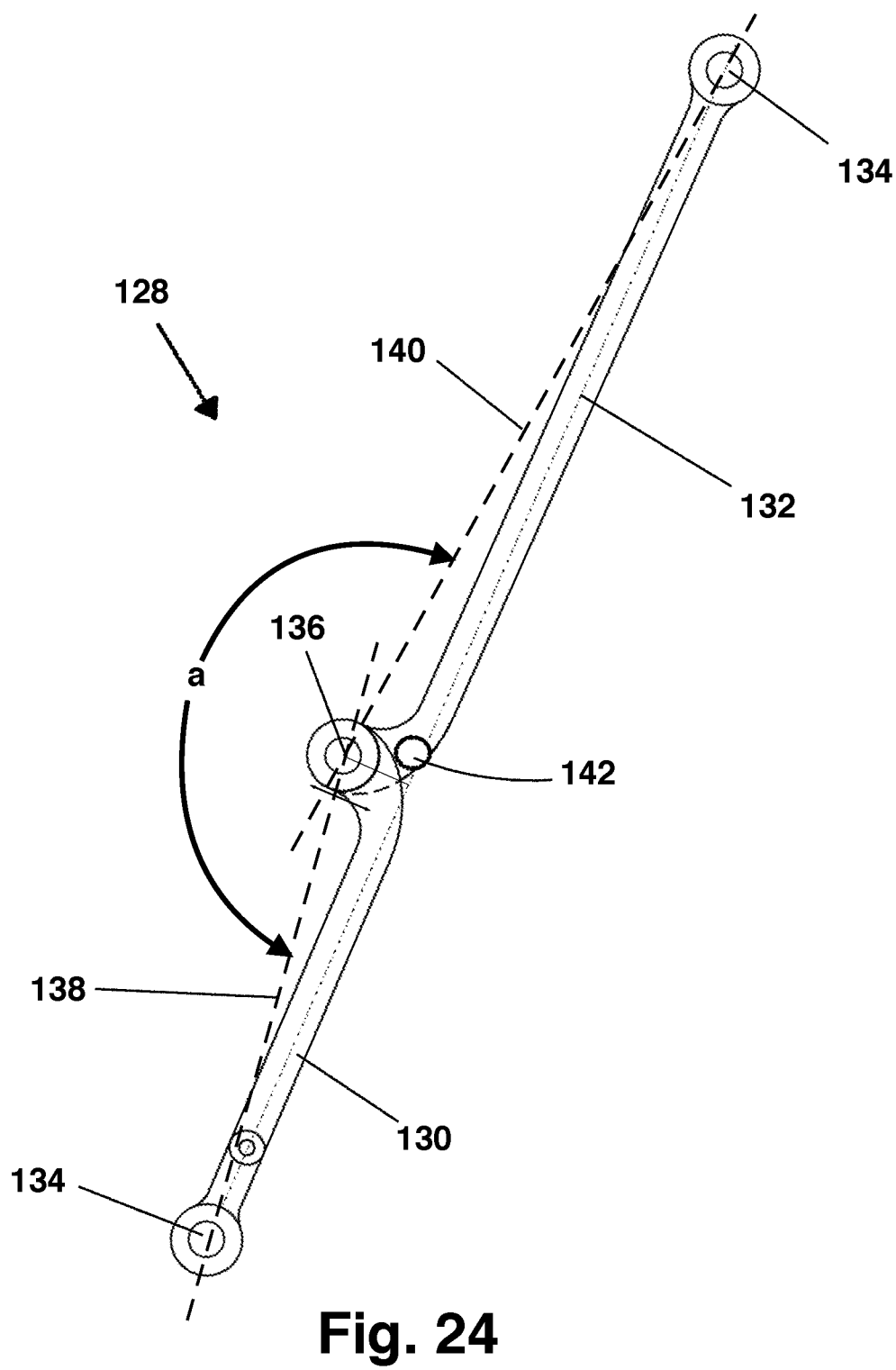
FIG. 24 is a detail plan view of the two-bar linkage.

From FIG. 24, the first bar 130 defines a first bar axis 138 between the hinge connection of the first bar 130 first end 134 and the first bar 130 second end 136. The second bar 132 defines a second bar axis 140 between the second bar 132 first end 134 and the second bar 132 second end 136. The first bar axis 138 and second bar axis 140 intersect to define angle 'a.' Angle 'a' is acute when the convertible thruster 10 is in the forward thrust position 14, as shown by FIG. 21. Angle 'a' is also acute when the convertible thruster 10 is in the intermediate position as shown by FIG. 22. Angle 'a' is greater than 180 degrees, that is, angle 'a' is obtuse, when the the convertible thruster 10 moves to the anti-torque position 12 as shown by FIGS. 23 and 24. From FIG. 24, in the anti-torque position 12, the two-bar linkage 128 is moved to an over-center position and may move against stop 142. In the over-center position, the thrust of the convertible thruster 10 will hold the two-bar linkage 128 against stop 142, which will prevent angle 'a' from increasing further. The over-center position of the two-bar linkage 128 prevents the thrust of the convertible thruster 10 from acting upon the pivot actuator 126 when the convertible thruster 10 is in the anti-torque position 12. This is a safety feature to prevent unintended movement of the convertible thruster 10 in the event that the pivot actuator 126 becomes inoperable when the compound aircraft is hovering or flying at a low speed.

Figure 25:
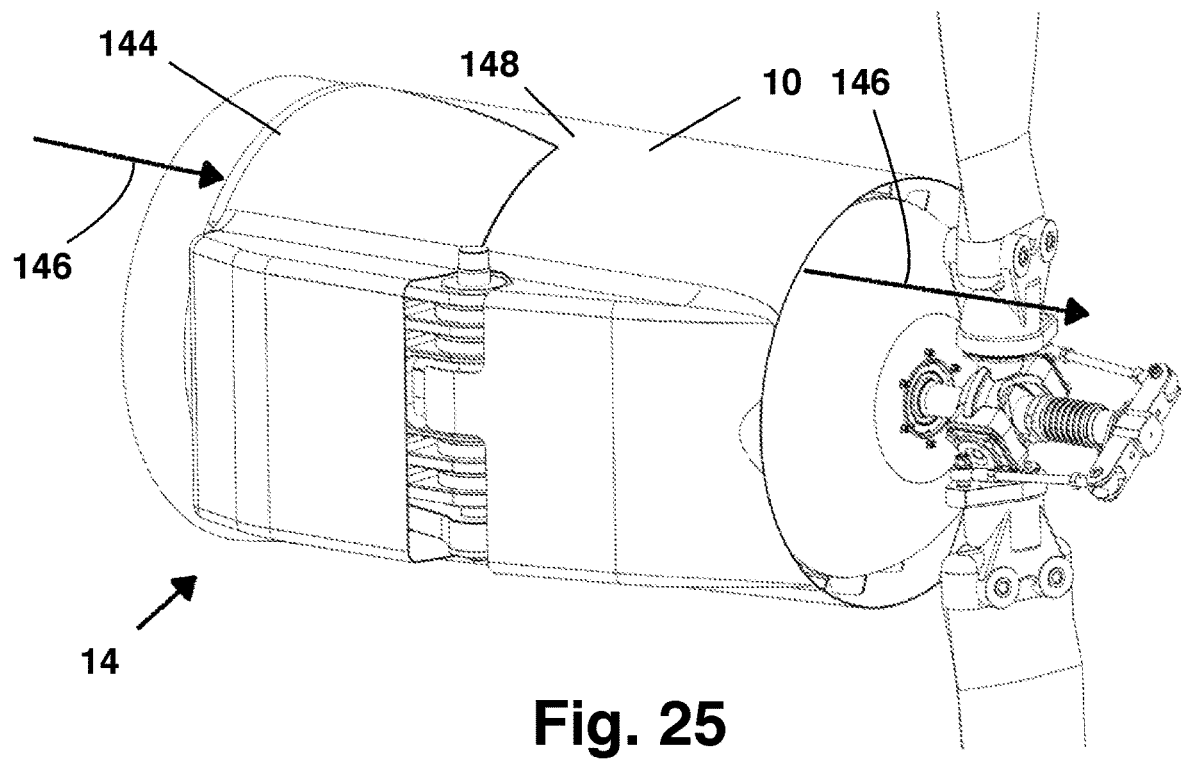
FIG. 25 is a detail view of the convertible thruster showing the air intake.

FIGS. 25 through 35 relate to thermal control of the convertible thruster 10. Electrical and mechanical losses of the electric motor 28 and pitch control actuator 44 generate heat. As shown by FIG. 25, when the compound aircraft 2 is flying in the forward direction 20 at high speed with the convertible thruster 10 in the forward thrust position 14, external air 146 is captured by an air intake 144 positioned to face the direction of flight. The passive flow of air 146 is adequate to cool the electric motor 28 and pitch control actuator 44.

Figure 26:
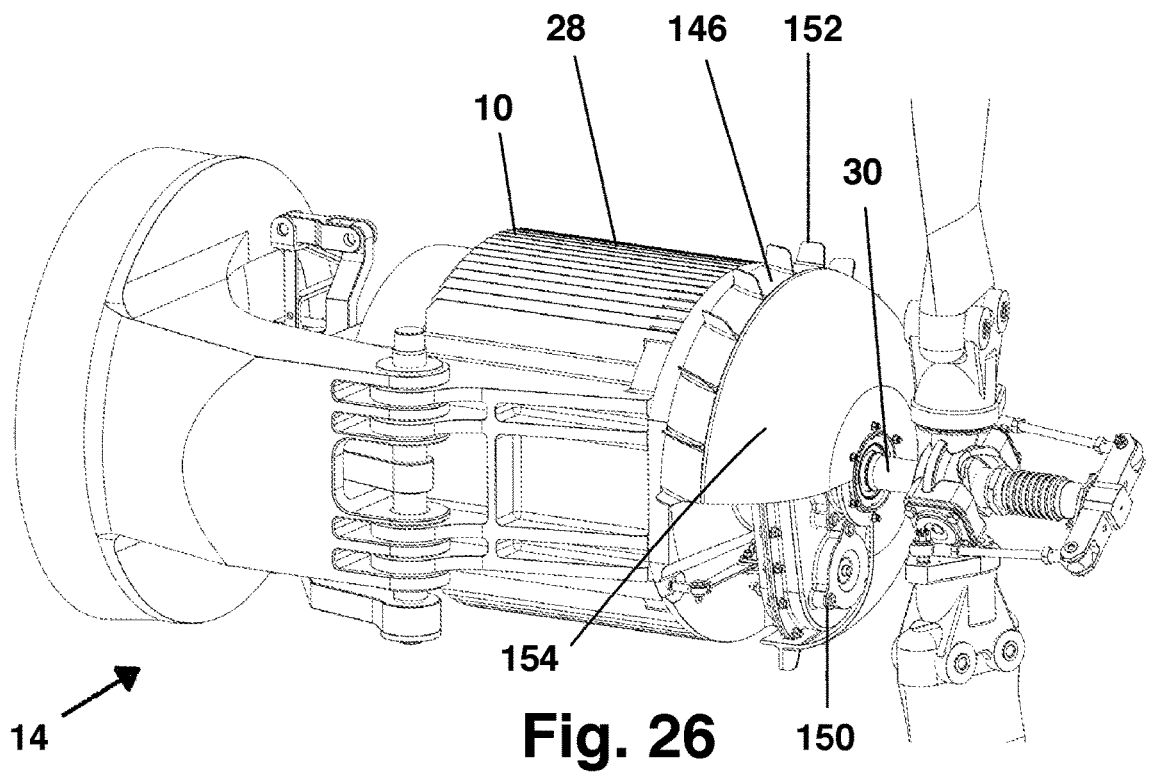
FIG. 26 is a detail perspective view of the convertible thruster showing a fan and gearbox.

FIG. 26 shows the convertible thruster 10 with the housing 148 removed. During low speed and hovering flight when the convertible thruster 10 is operating in the anti-torque position 12, the low relative airspeed and the orientation of the motor 28 could result in insufficient air 146 flow over the electric motor 28 and thruster pitch actuator 44 and inadequate cooling. To provide adequate airflow when the convertible thruster 10 is in the anti-torque position 12, a fan 146, shown by FIG. 26, is disposed about the circumference of the electric motor 28. The fan 146 is driven by the motor output shaft 30 through a gearbox 150. In FIG. 26, part of the fan 146 is cut away to show the gearbox 150.

From FIG. 26, the fan 146 is coaxial with the convertible thruster 10 and has a number of blades 152 extending radially from a disk-shaped hub 154 connected to an output gear flange 156 of the gearbox 150. The gearbox 150 provides a speed increase with respect to the electric motor 28 rotational speed. The speed increase is required to generate sufficient airflow with the limited fan blade 152 height available.

Figure 27:
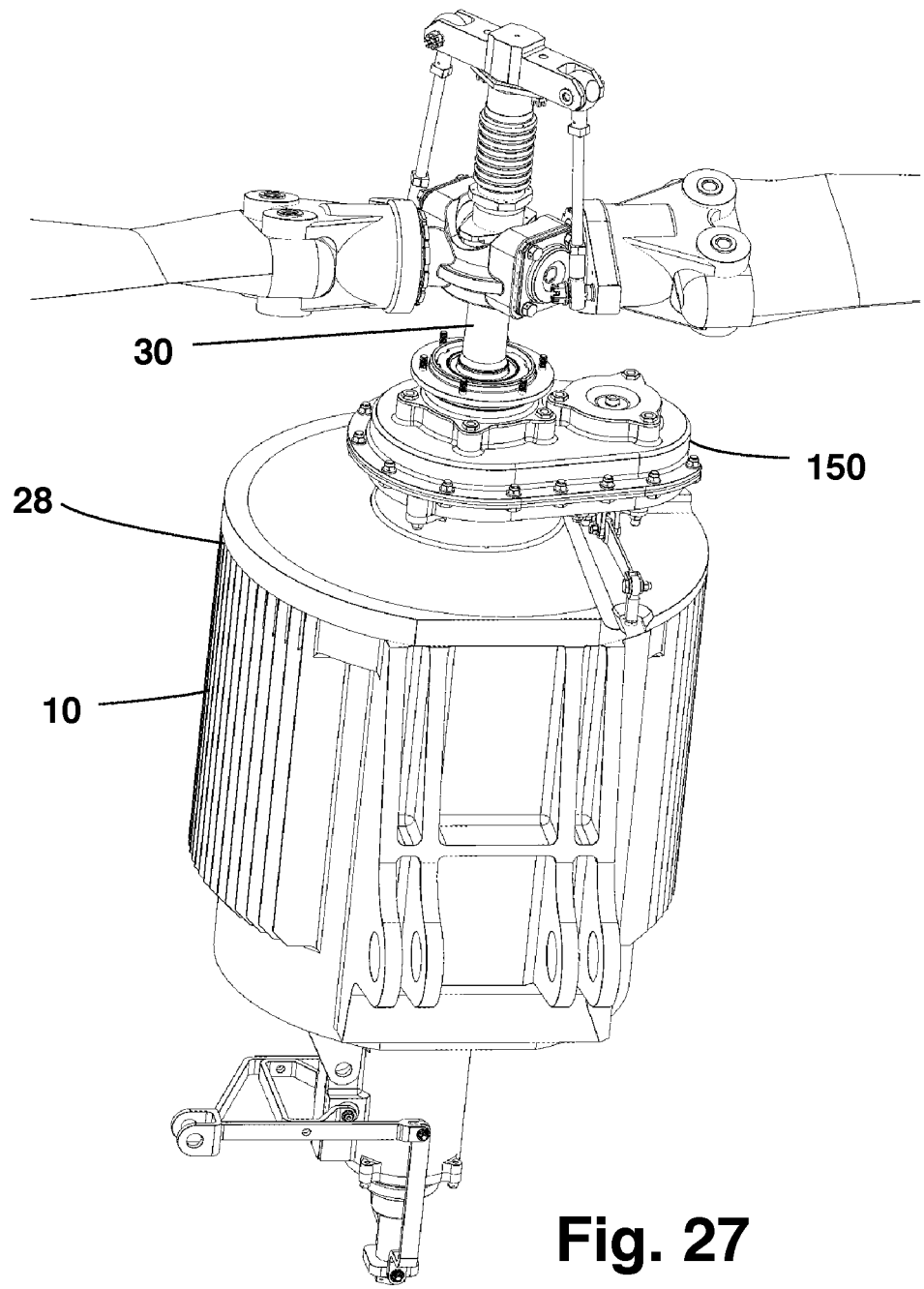
FIG. 27 is a perspective view showing the relation of the gearbox and the electric motor.
Figure 28:
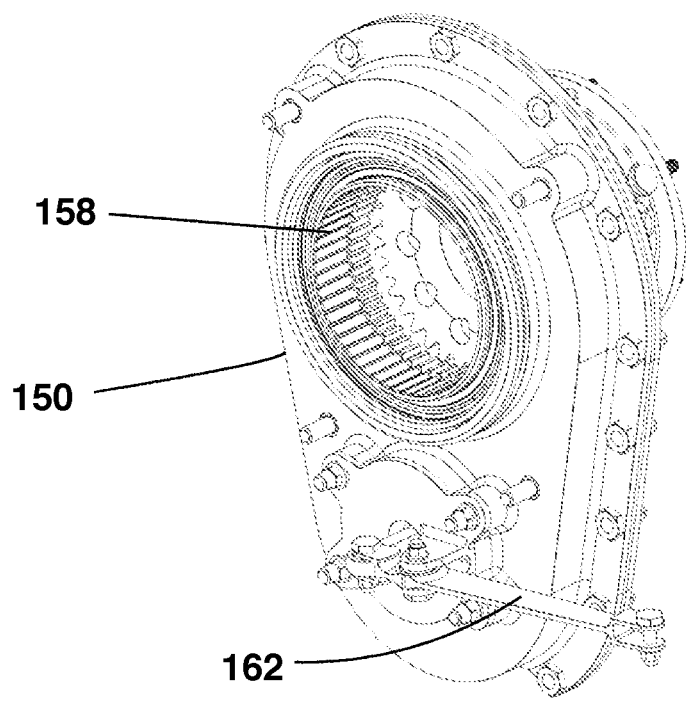
FIG. 28 is perspective view of the gearbox in isolation.
Figure 29:
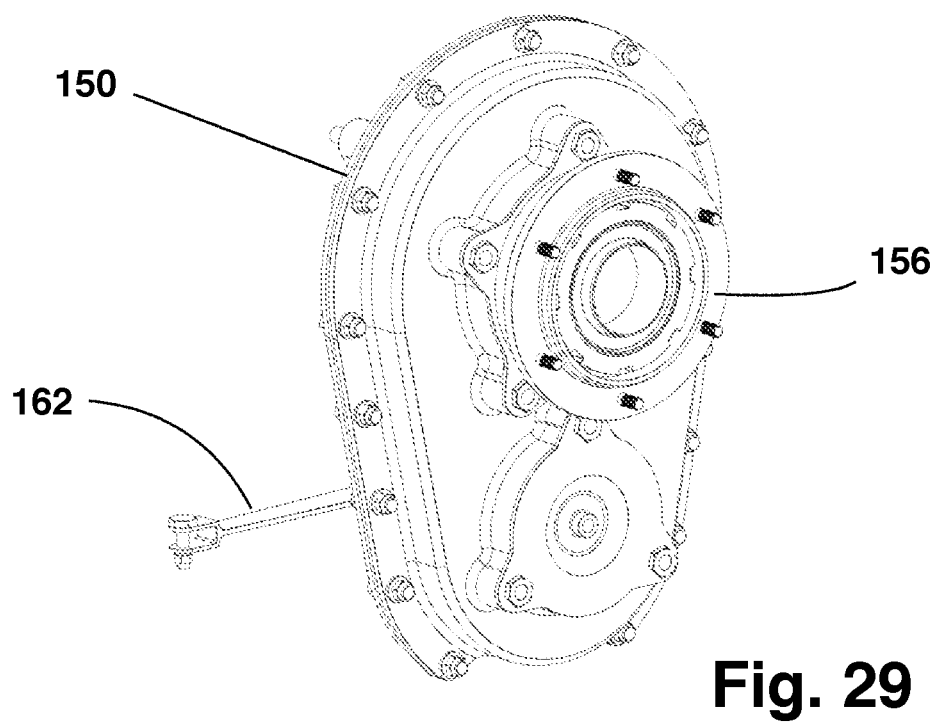
FIG. 29 is a second perspective view of the gearbox in isolation.

FIG. 27 shows the housing 148 and fan 146 removed to show the relation of the electric motor 28 and gearbox 150. FIGS. 28 and 29 are rear and front perspective views of the gearbox 150 in isolation. FIG. 28 shows the spline connection 158 of the motor output shaft 30 to the gearbox 150. FIG. 29 shows the output gear flange 156, which is coaxial with the motor output shaft 30 to which the fan hub 154 is attached. FIGS. 28 and 29 also show the clutch lever 162, discussed in the following paragraph.

Figure 30:
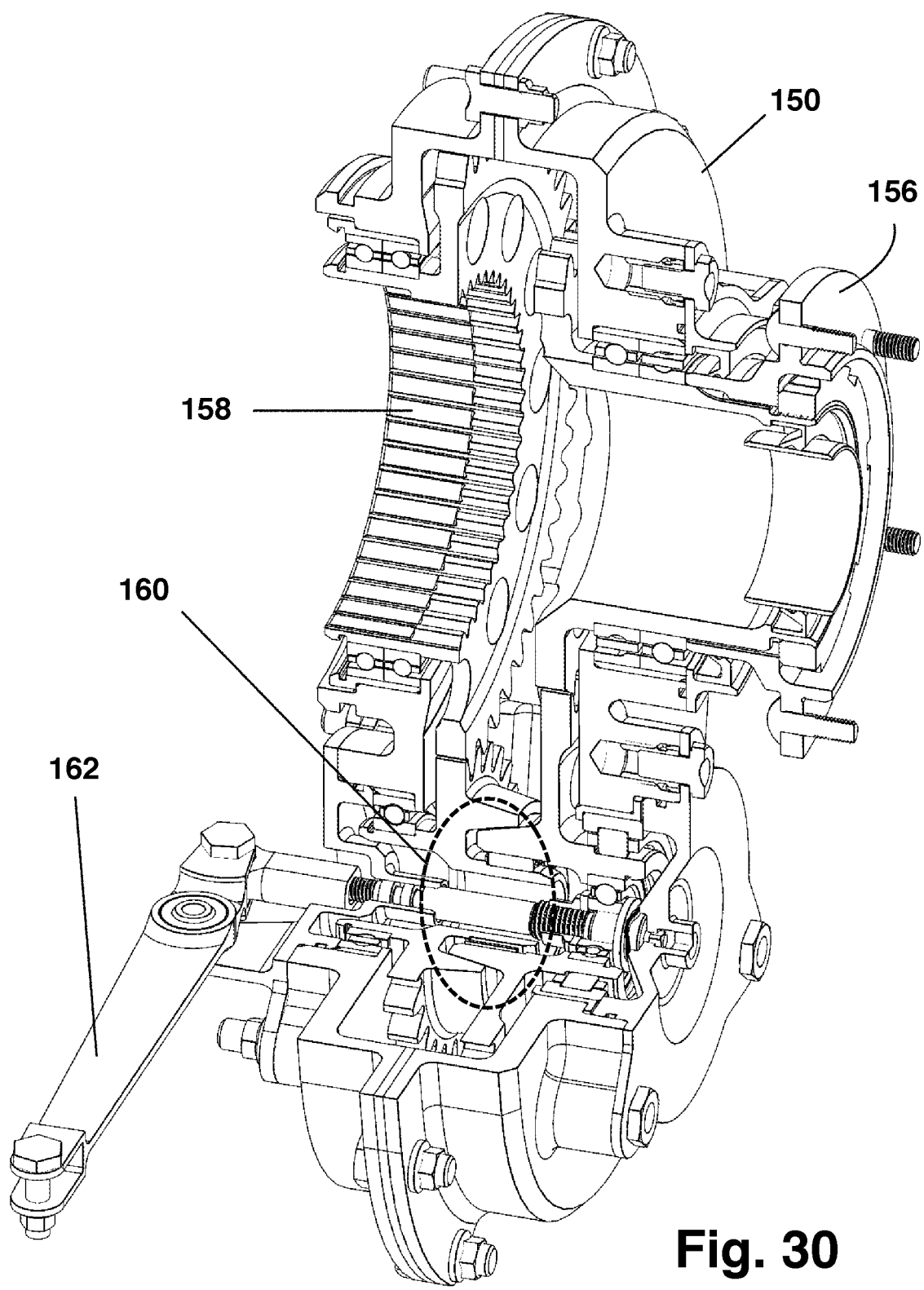
FIG. 30 is a detail cutaway view of the gearbox.
Figure 31:
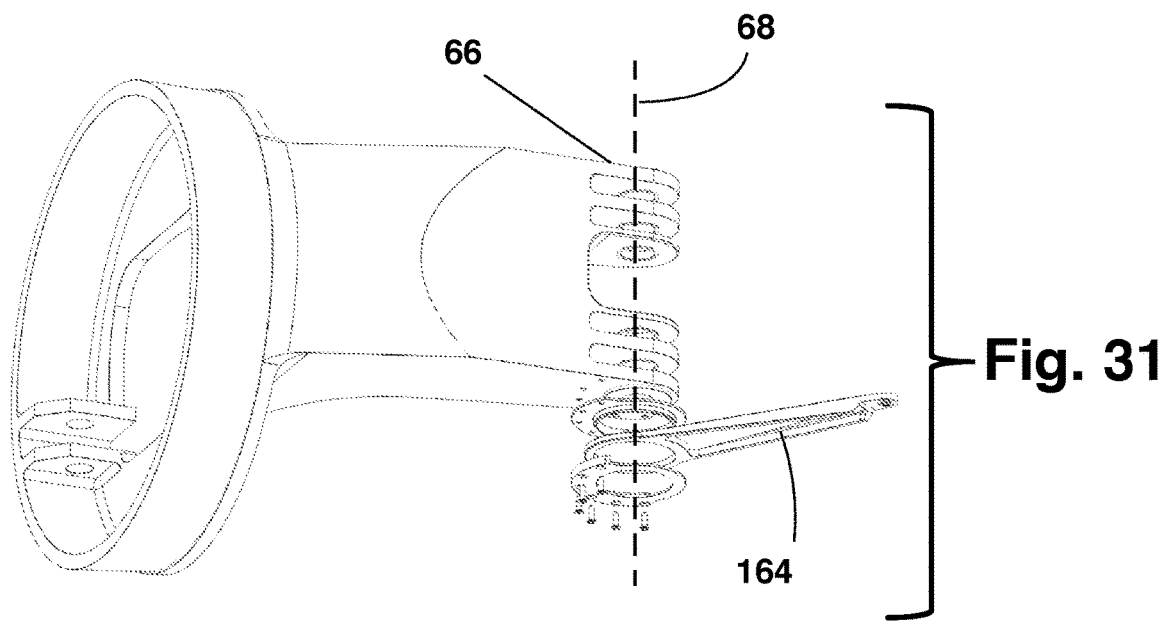
FIG. 31 is a detail exploded view of the position indicator arm and the pivot hinge.
Figure 32:
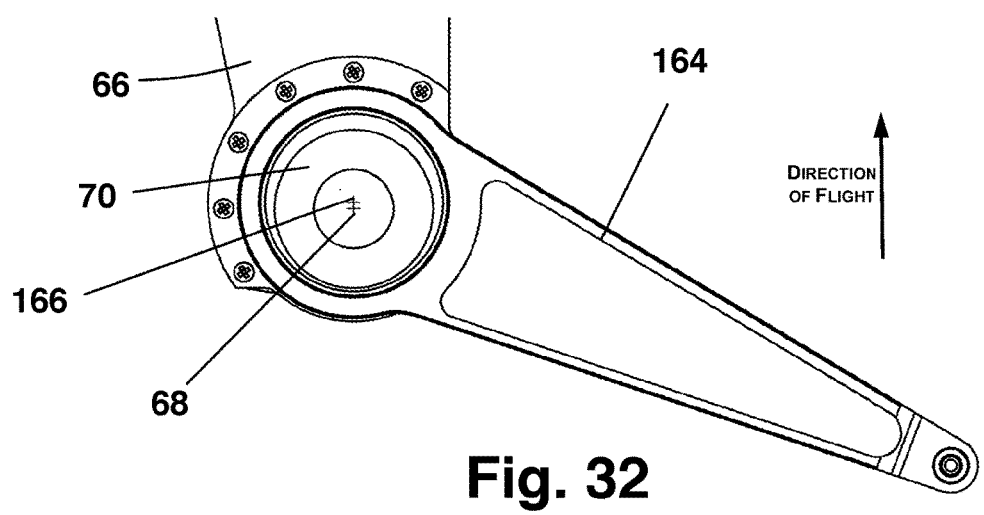
FIG. 32 is a detail plan view of the position indicator arm.

FIG. 30 is a cutaway view of the gearbox 150. The gearbox 150 includes a clutch 160 (enclosed by a dotted line on FIG. 30). The clutch 160 is normally engaged to drive the fan 146 but may disengage under the control of the clutch lever 162. In the example of FIG. 30, the clutch 160 is a conical clutch relying on the friction between two mating conical surfaces. It is also a wet clutch due to the fact that it is installed internally to the gearbox 150 and is therefore exposed to the lubricating fluid of the gearbox 150. Any other clutch 160 may be suitable, such as a single or multi-disk clutch in either a wet or dry configuration. Movement of the clutch lever 162 may disengage the clutch 160 and stop the rotation of the fan 146.

FIGS. 31 through 34 illustrate that the clutch lever 162 may disengage the clutch 160 when the convertible thruster 10 is in the forward thrust position 14. From FIGS. 31 and 32, a position indicator arm 164 is attached to the pivot hinge 66 by a bearing so that the position indicator arm 164 can pivot with the convertible thruster 10; however, the position indicator arm 164 does not pivot about the pivot axis 68 but about its own position indicator arm axis 166 that is displaced from the pivot axis 68. The eccentric displacement of the position indicator arm axis 166 results in motion of the position indicator arm 164 with respect to the clutch lever 162 when the convertible thruster 10 moves to the forward thrust position 14.

Figure 33:
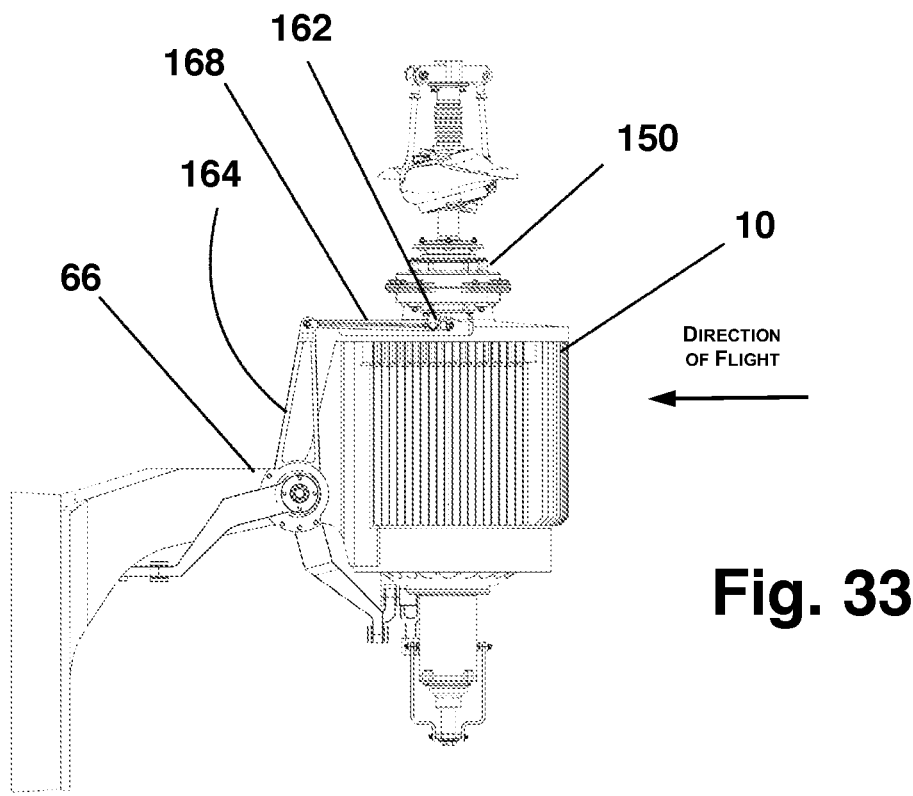
FIG. 33 is a detail plan view of the convertible thruster in the anti-torque position with the housing removed showing the position indicator and position indicator linkage.
Figure 34:
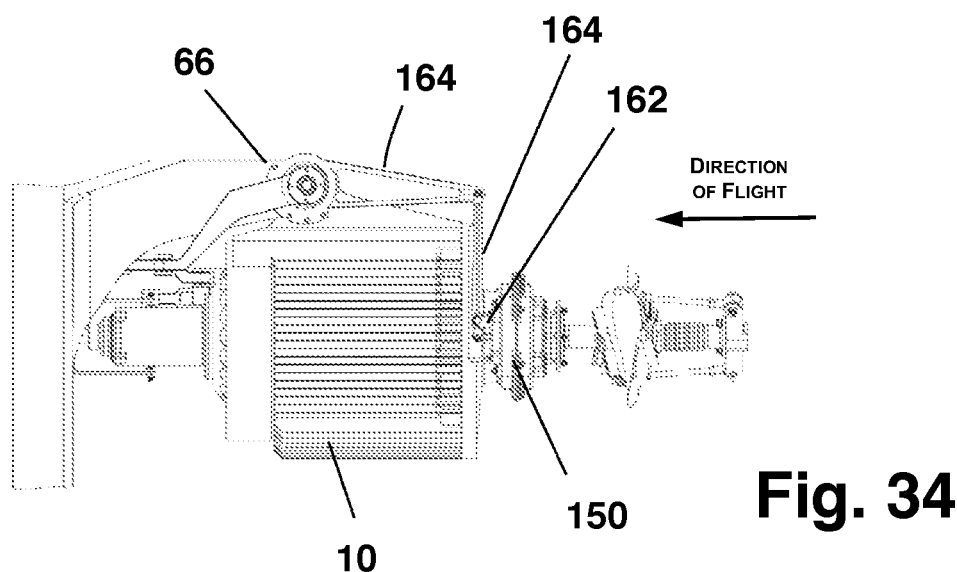
FIG. 34 is a detail plan view of the convertible thruster in the forward thrust position with the housing removed showing the position indicator and position indicator linkage.

From FIGS. 33 and 34, the position indicator arm 164 moves position indicator linkage 168, which moves the clutch lever 162, releasing the clutch 160 when the convertible thruster 10 is in the forward thrust position 14. Any other system can be used to release the clutch 160 when the convertible thruster 10 is in the forward thrust position 14, for example a cam and follower, an arm attached to the fuselage that the convertible thruster 10 encounters when moving to the forward thrust position 14, an arm on the convertible thruster 10 that encounters corresponding structure on the fuselage 4 when the convertible thruster 10 moves to the forward thrust position 14, a limit switch that detects the position of the convertible thruster 10, or any other suitable mechanism to detect the rotational position of one object with respect to another.

Figure 35:
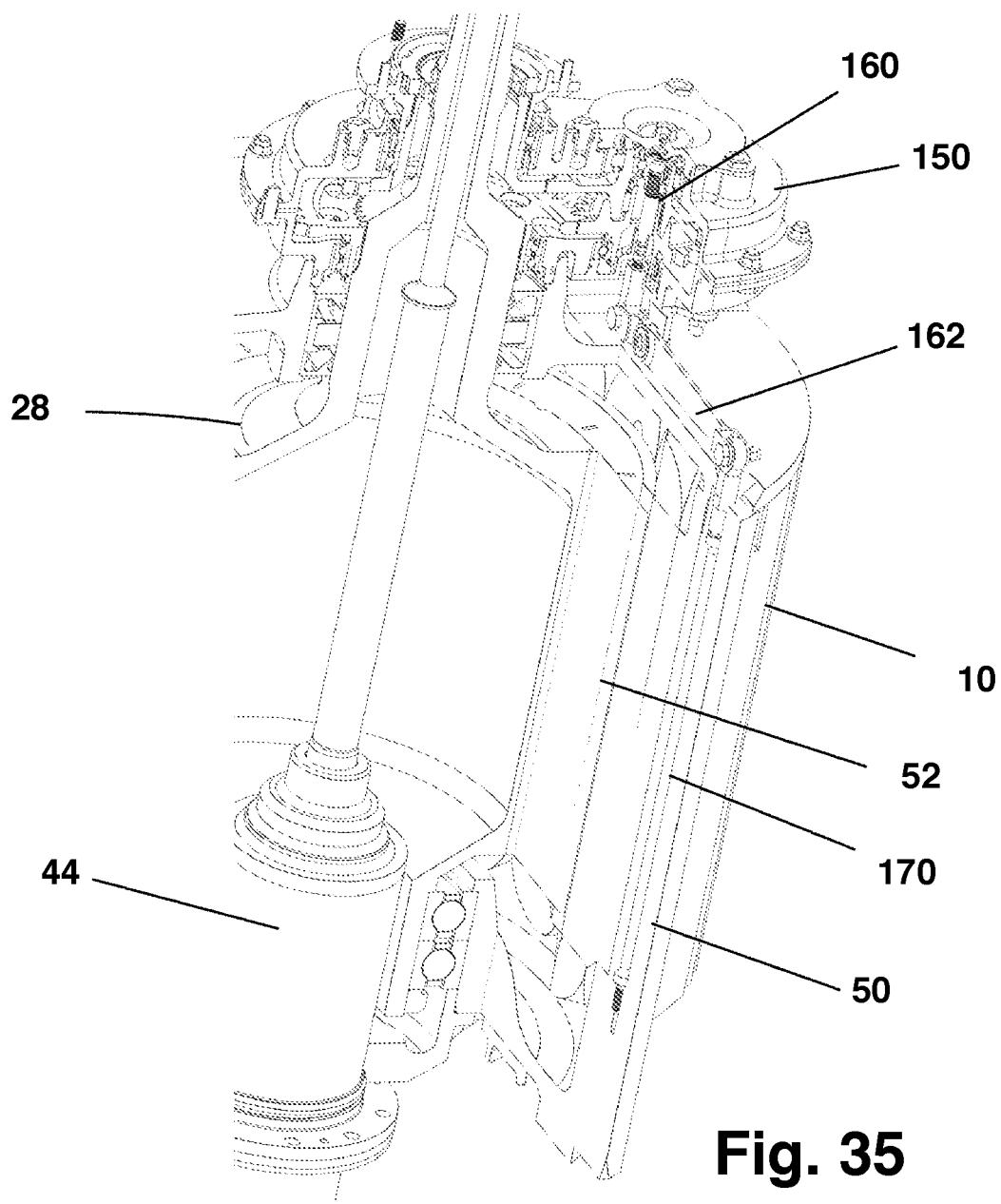
FIG. 35 is a detail section view of the electric motor showing the thermal expansion material and clutch lever.

FIG. 35 is a cutaway view of the electric motor 28, gearbox 150 and clutch 160. As shown by FIG. 35, the clutch 160 may release and stop the fan 146 when the temperature of the electric motor 28 is below a deactivation temperature. From FIG. 35, a thermal expansion material 170 that has a high coefficient of thermal expansion, such as an aluminum rod, is disposed in thermal communication with the windings 52 of the electric motor 28. The thermal expansion material 170 may be mounted in a longitudinal cavity in the motor housing 50 and restrained to the housing at one end. The other end of the thermal expansion material 170 is connected to the clutch lever 162. The thermal expansion material 170 is mounted loosely inside the motor housing 50 and is surrounded by heat transfer grease, The temperature of the thermal expansion material 170 will reflect the temperature of the windings 52, while the thermal expansion material 170 is free to expand and contract as needed. The length of the thermal expansion material 170 is selected so that when the thermal expansion material 170 is below a deactivation temperature, the thermal expansion material acts upon the clutch lever 162, releasing the clutch 160. Above the deactivation temperature, the thermal expansion material 170 does not act upon the clutch lever 162 and does not release the clutch 160. Thereby the fan 146 is mechanically operated and thermostatically controlled.

In the above alternatives, the clutch 160 is normally engaged so that failure of any of the control rods, linkages and associated fasteners will result in activation of the fan 146, providing safe operation of the compound aircraft 2 during a subsequent landing phase.

Figure 36:
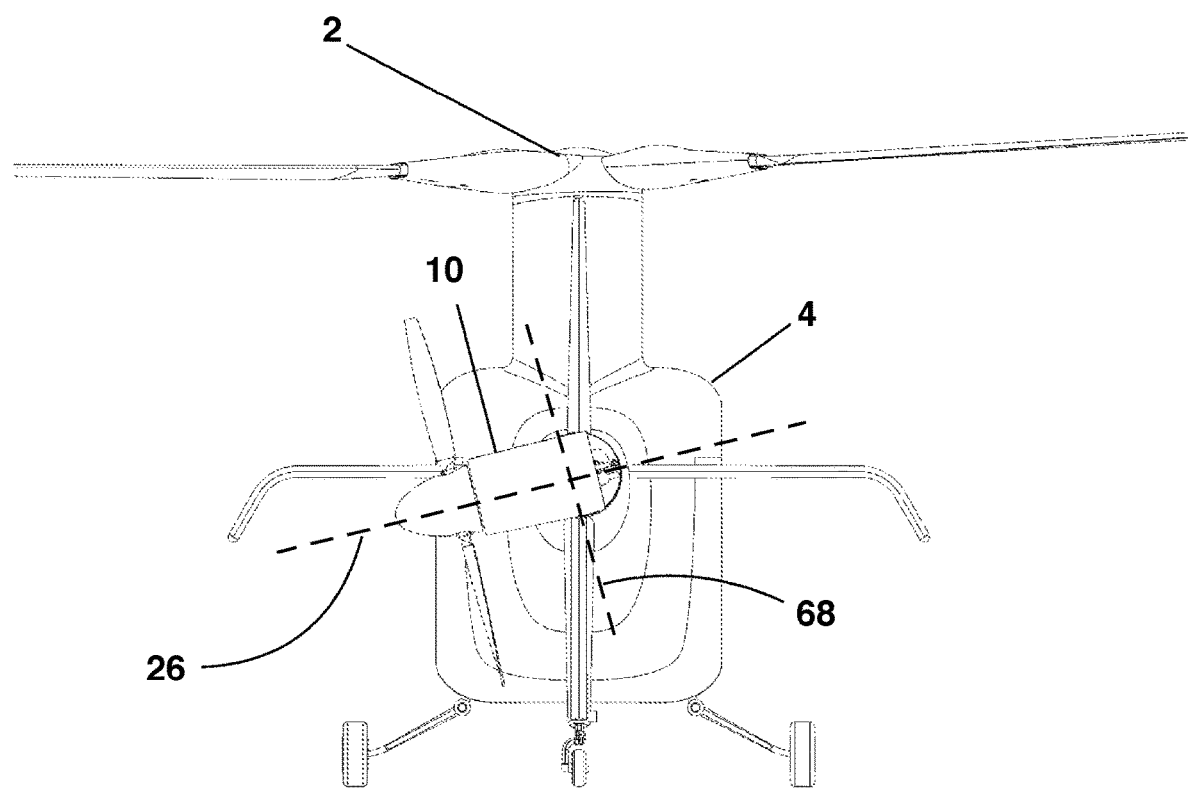
FIG. 36 is a rear view of the compound aircraft showing a tilted convertible thruster.

In FIG. 1, the pivot axis 68 is depicted as oriented vertically. In some applications, as illustrated in FIG. 36, the pivot axis 68 may be slightly inclined laterally in a plane transversal and perpendicular to the aircraft longitudinal axis 6, so that the thruster axis of rotation 26 is deflected downwards when the convertible thruster 10 is in the anti-torque position 12. The downward deflection of the thruster axis of rotation 26 provides a small upward thrust component if needed for better trimming of the compound aircraft 2 in hover and low-speed flight.

THE FOLLOWING IS A LIST OF NUMBERED ELEMENTS FROM THE SPECIFICATION AND DRAWINGS

Compound aircraft 2
Fuselage 4
Longitudinal axis 6
Main rotor 8
Convertible thruster 10
Anti-torque position 12
Forward thrust position 14
Vertical stabilizer 16
Rudder 18
Forward direction 20
Thruster rotor 22
Thruster blades 24
Thruster axis of rotation 26
Electric motor 28
Motor output shaft 30
Pitch control actuator output shaft 32
Axial direction 34
Crosspiece 36
Crosspiece bearing 38
Pitch links 40
Blade bearings 42
Pitch control actuator 44
Stator 46
Electric motor rotor 48
Motor housing 50
Windings 52
Magnets 54
Pitch control actuator input lever 56
Pitch control actuator electric motors 58
Ball screw 60
Screw shaft 62
Brake 64
Pivot hinge 66
Convertible thruster pivot axis 68
Hollow pins 70
Transfer rod 72
Transfer rod linkage 74
Transfer rod input member 76
Transfer rod bearing 78
First inceptor 80
Second inceptor 82
Mixer 84
First inceptor input link 86
First inceptor input link 88
First input line of action 90
Second inceptor input link 92
Second inceptor line of action 94
Mixer intermediate links 96
Rocker 98
Mixer body 100
Curved slot 102
Follower 104
Connecting rod 106
Output rod 108
Output rod line of action 110
Feedback input link 112
feedback mechanical linkage 114
Mixer bell cranks 116
Mixer bell crank hinges 118
Mixer bell crank rod 120
Slider 122
Lifting link 124
Pivot actuator 126
Pivoting linkage 128
First bar 130
Second bar 132
First end 134
Second end 136
First bar axis 138
Second bar axis 140
Angle 'a'
Stop 142
Air intake 144
Fan 146
Convertible thruster housing 148
Gearbox 150
Fan blades 152
Fan hub 154
Output gear flange 156
Spline connection 158
Clutch 160
Clutch lever 162
Position indicator arm 164
Position indicator arm axis 166
Position indicator linkage 168

What is claimed is:

1. A compound aircraft, the compound aircraft comprising:
   a. a fuselage defining a longitudinal axis;
   b. a convertible thruster attached to the fuselage, the convertible thruster having a convertible thruster rotor and an electric motor configured to rotate the convertible thruster rotor, the convertible thruster rotor defining a thruster rotor axis of rotation, the convertible thruster rotor having a variable pitch, the convertible thruster including a pitch control actuator, the pitch control actuator having a configuration to determine the pitch of the convertible thruster rotor;
   c. a convertible thruster pivot axis, the convertible thruster being pivotable about the convertible thruster pivot axis between an anti-torque position in which the axis of rotation of a convertible thruster rotor is generally normal to the aircraft longitudinal axis, a forward thrust position in which the axis of rotation of the convertible thruster rotor is generally parallel to the aircraft longitudinal axis, and a plurality of intermediate positions between the anti-torque position and the forward thrust position;
   d. a first inceptor and a second inceptor, the first inceptor being configured to generate a first inceptor mechanical signal, the second inceptor being configured to generate a second inceptor mechanical signal, the first and second inceptors being operably attached to a mechanical inceptor linkage;
   e. a mixer operably attached to the mechanical inceptor linkage, the mixer receiving the first inceptor mechanical signal and the second inceptor mechanical signal through the mechanical inceptor linkage, the mixer having a configuration to mechanically mix the first inceptor mechanical signal and the second inceptor mechanical signal based on whether the convertible thruster is in the anti-torque position, the forward thrust position or in the plurality of intermediate positions, the mixer being configured to generate a mixer output mechanical signal based on the mixed first inceptor mechanical signal and the second inceptor mechanical signal;
   f. a pitch control actuator mechanical linkage, the pitch control actuator mechanical linkage having a configuration to convey the mixer output mechanical signal to the pitch control actuator.

2. The compound aircraft of claim 1 wherein the electric motor and the pitch actuator are unitary.

3. The compound aircraft of claim 1 wherein the configuration of the mixer to mix the first inceptor mechanical signal and the second inceptor mechanical signal comprises:
   a. a rocker having a configuration for motion along a first input line of action and a configuration for motion along a second input line of action, the first and second lines of action being parallel and in a spaced-apart relation, the first and second lines of action defining a mathematical plane;
   b. a connecting rod having a first end and an opposing second end, the first end of the connecting rod engaging the rocker, the first end of the connecting rod being slidable between the first line of action and the second line of action, the first end of the connecting rod being movable by the rocker in response to movement of the rocker along the first input line of action and the second input line of action;
   c. an output rod, the output rod being movable along an output rod line of action, the output rod line of action being coincident with the mathematical plane and parallel to the first and second input lines of action, the output rod line of action being intermediate between the first and second input lines of action, the output rod being operably connected to the pitch control actuator;
   d. a feedback input link, the feedback input link having a feedback input link position that is determined by whether the convertible thruster is in the anti-torque position, the forward thrust position or in the plurality of intermediate positions, the feedback input link being operably attached to the connecting rod and having a configuration to slide the first end of the connecting rod between the first line of action and the second line of action.

4. The compound aircraft of claim 3 wherein the configuration of the rocker for motion along the first line of action comprises: a first inceptor input link that is operably connected to the first inceptor through the inceptor mechanical linkage so that the first inceptor link moves in response to motion of the first inceptor, the first inceptor link having a hinged connection to the rocker, and wherein g the configuration of the rocker for motion along the second line of action comprises: a second inceptor input link that is operably connected to the second inceptor so that the second inceptor link moves in response to motion of the second inceptor, the second inceptor link having a hinged connection to the rocker, the hinged connection of the first inceptor link and the hinged connection of the second inceptor link being in a spaced-apart relation.

5. The compound aircraft of claim 3, further comprising: a mixer body, the rocker being disposed within the mixer body, the rocker having a first end and an opposing second end, the rocker being tiltable within the mathematical plane in response to motion of the rocker along the first and second lines of action, the first and second ends of the rocker being curved so that the rocker does not interfere with the mixer body when the rocker tilts in response to motion of the rocker along the first and second lines of action.

6. The compound aircraft of claim 3 wherein the first end of the connecting rod is slidable with respect to the rocker along a curved path, the curved path having a radius of curvature, the radius of curvature being equal to a distance between the first end and the second end of the connecting rod.

7. The compound aircraft of claim 3 wherein the configuration of the feedback input link to slide the first end of the connecting rod between the first line of action and the second line of action comprises: a lifting link operably attached to the feedback input link, the lifting link being movable generally normal to the output rod line of action, the lifting link engaging the connecting rod for motion normal to the first and second lines of action, the lifting link slideably engaging the connecting rod for motion along the output rod line of action, whereby the lifting link moves the first end of the connecting rod normal to the first and second lines of action but does not move the connecting rod along the output rod line of action.

8. The compound aircraft of claim 7 wherein the configuration of the lifting link to move the first end of the connecting rod further comprises: a horizontal bar that defines a lifting link slide path, the lifting link slide path being parallel to the output rod line of action, the horizontal bar being operably attached to the feedback input link, the horizontal bar being movable by the feedback input link normal to the output rod line of action, the lifting link engaging the horizontal bar and being slidable along the lifting link slide path.

9. The compound aircraft of claim 3, the compound aircraft further comprising: a transfer rod, the transfer rod being movable axially parallel to the convertible thruster pivot axis in response to motion of the output rod of the mixer when convertible thruster is in the anti-torque position, the forward thrust position, and the plurality of intermediate positions, the transfer rod being operably connected to the pitch control actuator so that a transfer rod position along the convertible pivot axis defines the mechanical signal to the pitch control actuator and the pitch of the convertible thruster rotor for each of the anti-torque position, the thrust position, and the intermediate position.

10. The compound aircraft of claim 9 wherein the transfer rod is coaxial with the convertible thruster pivot axis.

11. The compound aircraft of claim 9 wherein the electric motor is disposed between the pitch control actuator and the convertible thruster rotor, the electric motor being configured to rotate the convertible thruster rotor through a motor output shaft, the motor output shaft being hollow, the pitch control actuator being configured to move a pitch control actuator output shaft axially within the hollow motor output shaft when the motor output shaft is rotating the convertible thruster rotor, the pitch control actuator output shaft being configured to define the pitch of the convertible thruster rotor blades based on the axial position of the pitch control actuator output shaft.

12. The compound aircraft of claim 11 wherein the configuration of the pitch control actuator output shaft to define the pitch of the convertible thruster rotor comprises:
  a. a thruster rotor blade defined by the thruster rotor, the thruster rotor blade having a span axis, the thruster rotor blade being rotatable about the span axis;
  b. a cross piece, the cross piece being rotatable with the thruster rotor about the thruster rotor axis of rotation, the cross piece being rotatable with respect to the pitch control actuator output shaft, the cross piece being movable axially along the thruster rotor axis of rotation by the pitch control actuator output shaft;
  c. a pitch link, the pitch link being attached to the cross piece, the pitch link being attached the rotor blade in a spaced-apart relation to the span axis.

13. The compound aircraft of claim 11 in which the configuration of the pitch control actuator to move the pitch control actuator output shaft axially comprises: a first and a second electric actuator motor contained within the pitch control actuator, the first and second electric actuator motors being operably attached to the pitch control actuator output shaft for movement of the pitch control actuator output shaft, the first and second electric actuator motors having a configuration to move the pitch rod axially as commanded by the mechanical signal from the mixer if either of the first or second electrical motors is not operable.

14. The compound aircraft of claim 11 wherein the pitch control actuator consists of one of a mechanical linkage and a hydraulic dual piston servo.

15. The compound aircraft of claim 1 wherein the electric motor that is configured to rotate the convertible thruster comprises:
  a. a motor case;
  b. a motor rotor configured for rotation and enclosed within the motor case, the motor rotor defining the motor output shaft;
  c. a plurality of stators disposed within the motor case, each of the plurality of stators configured to generate a rotating magnetic field so that the plurality of stators in combination with the motor rotor defines a plurality of electric motors;
  d. a plurality of variable frequency drives, each of the variable frequency drives being operably attached to a one of the plurality of electric motors, whereby the plurality of electric motors will continue to rotate the convertible thruster rotor if one of the electric motors becomes inoperable.

16. The compound aircraft of claim 1, the compound aircraft further comprising: a pivot actuator having a configuration to pivot the convertible thruster between the anti-torque position, the forward thrust position, and the plurality of intermediate positions so that the pivot actuator does not support a thrust of the vectored thruster when the convertible thruster is in the anti-torque position.

17. The compound aircraft of claim 16 wherein the configuration of the pivot actuator to pivot the convertible thruster comprises:
  a. a two-bar linkage having a first bar and a second bar, each of the first and second bars has a first end and a second end;
  b. the first end of the first bar being rotatably attached to the fuselage in a spaced apart relation to the convertible thruster pivot axis;
  c. the first end of the second bar being rotatably attached to the convertible thruster in a spaced apart relation to the convertible thruster pivot axis,
  d. the second end of the first bar being rotatably attached to the second end of the second bar;
  e. the pivot actuator being attached to the first bar or the second bar intermediate to the first end of the first bar and the first end of the second bar.

18. The compound aircraft of claim 17 wherein the first bar defines a first bar axis between the rotatable connections of the first bar first end and the first bar second end, the second bar defines a second bar axis between the rotatable connections of the second bar first end and the second bar second end, the first bar axis and the second bar axis intersecting to define an angle, the angle being acute when the convertible thruster is in the forward thrust position or an intermediate position, the angle being obtuse when the convertible thruster is in the anti-torque position, the two bar linkage further comprising: a stop, the stop preventing the movement of the first bar and the second bar beyond the anti-torque position when the convertible thruster is in the anti-torque position, whereby the first and second bars overlock in the anti-torque position and prevent the thrust of the convertible thruster from acting upon the pivot actuator.

19. The compound aircraft of claim 1, the aircraft further comprising: a fan driven by the electric motor, the fan having a configuration to blow an air over the electric motor to cool the motor when the convertible thruster is in the anti-torque position, the fan having a configuration not to blow air when the convertible thruster is in the forward thrust position.

20. The compound aircraft of claim 18 wherein the configuration of the fan to blow air over the motor comprises:
  a. a clutch, the clutch being normally engaged to operate the fan;
  b. a position detection mechanical linkage, the position detection linkage configured to detect whether the convertible thruster is in the forward thrust position, the position detection mechanical linkage being configured to disengage the clutch when the convertible thruster is in the forward thrust position.

21. The compound aircraft of claim 1, the aircraft further comprising:

a. a fan driven by the electric motor the fan being configured to blow an air over the electric motor to cool the electric motor;
b. a thermal expansion material, the thermal expansion material being in thermal communication with a stator of the electric motor;
c. a clutch that is normally engaged to drive the fan, the thermal expansion material being mechanically attached to the clutch to disengage the clutch when a temperature of the stator is below a deactivation temperature, the thermal expansion material being configured not to disengage the clutch when the temperature of the stator is above the deactivation temperature.

\* \* \* \* \*